US012591318B2

(12) United States Patent
Kato et al.

(10) Patent No.: US 12,591,318 B2
(45) Date of Patent: Mar. 31, 2026

(54) PEN INPUT DEVICE SHEET WITH ELASTIC LAYER HAVING RECESSED PROTRUDING PATTERN FACING A POSITION DETECTING DEVICE

(71) Applicant: Wacom Co., Ltd., Saitama (JP)

(72) Inventors: So Kato, Saitama (JP); Masamitsu Ito, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/809,143

(22) Filed: Aug. 19, 2024

(65) Prior Publication Data

US 2024/0411387 A1      Dec. 12, 2024

Related U.S. Application Data

(63) Continuation of application No. PCT/JP2022/047965, filed on Dec. 26, 2022.

(30) Foreign Application Priority Data

Feb. 28, 2022      (JP) .................................. 2022-029543

(51) Int. Cl.
*G06F 3/0354*          (2013.01)

(52) U.S. Cl.
CPC .................... *G06F 3/03545* (2013.01); *G06F 2203/04101* (2013.01)

(58) Field of Classification Search
CPC ................. G06F 3/03545; G06F 3/041; G09F 2203/04101
See application file for complete search history.

(56) References Cited

U.S. PATENT DOCUMENTS

2021/0173512 A1*  6/2021  Taya ...................... G06F 3/0416
2022/0033600 A1*  2/2022  Hoshino .................. C08J 7/043

FOREIGN PATENT DOCUMENTS

JP          2006-119772 A      5/2006
JP          2014-137640 A      7/2014
(Continued)

OTHER PUBLICATIONS

English Translation of International Search Report for International Application No. PCT/JP2022/047965, mailed Mar. 7, 2023. (2 pages).

*Primary Examiner* — Liliana Cerullo
(74) *Attorney, Agent, or Firm* — Seed Intellectual Property Law Group LLP

(57)          ABSTRACT

Provided is a pen input device sheet disposed over a position detection region of a position detecting sensor, the pen input device sheet including an elastic material layer that is composed of a plurality of layer portions stacked in a thickness direction and has elasticity, an opposite side of a side of the position detecting sensor in the elastic material layer being employed as a side of a writing input surface to which writing input with an electronic pen is made, and the pen input device sheet being configured such that a vibration frequency characteristic of a kinetic friction coefficient when the electronic pen is moved at a predetermined speed on the writing input surface of the pen input device sheet matches a vibration frequency characteristic of a kinetic friction coefficient when a predetermined writing material is moved at the predetermined speed on a predetermined writing medium.

12 Claims, 22 Drawing Sheets

(56) References Cited

FOREIGN PATENT DOCUMENTS

| JP | 2014-149817 A | 8/2014 |
| JP | 2015-54417 A | 3/2015 |
| JP | 2018-81482 A | 5/2018 |
| JP | 2018-128827 A | 8/2018 |
| JP | 2018-173905 A | 11/2018 |

* cited by examiner

F I G . 4 A
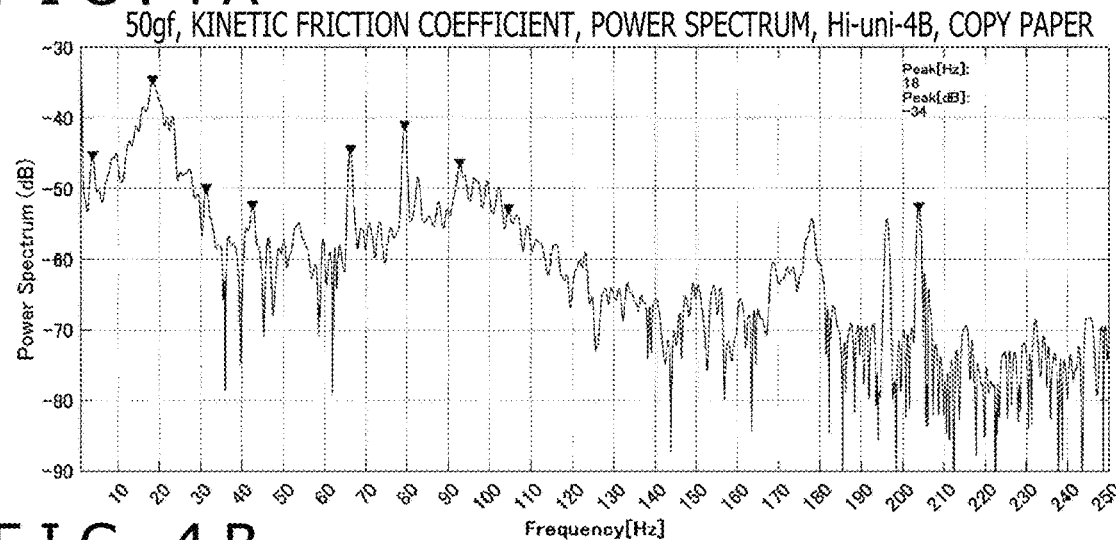
F I G . 4 B
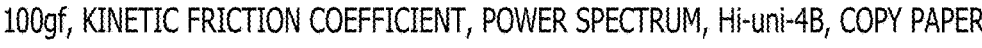
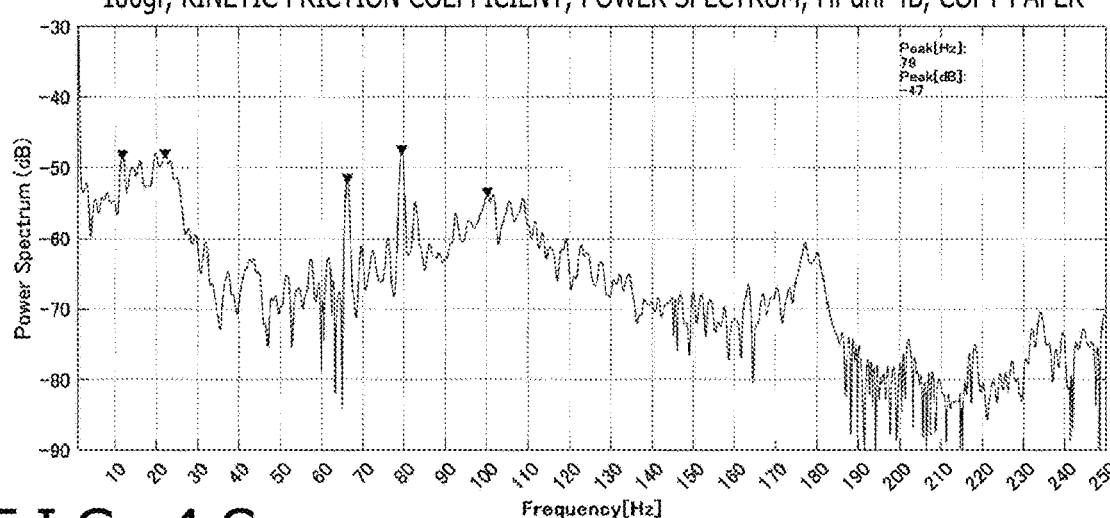
F I G . 4 C

50gf, KINETIC FRICTION COEFFICIENT, POWER SPECTRUM, Hi-uni-2B, COPY PAPER

100gf, KINETIC FRICTION COEFFICIENT, POWER SPECTRUM, Hi-uni-2B, COPY PAPER

200gf, KINETIC FRICTION COEFFICIENT, POWER SPECTRUM, Hi-uni-2B, COPY PAPER

50gf, KINETIC FRICTION COEFFICIENT, POWER SPECTRUM, Hi-uni-HB, COPY PAPER

100gf, KINETIC FRICTION COEFFICIENT, POWER SPECTRUM, Hi-uni-HB, COPY PAPER

200gf, KINETIC FRICTION COEFFICIENT, POWER SPECTRUM, Hi-uni-HB, COPY PAPER

F I G . 8
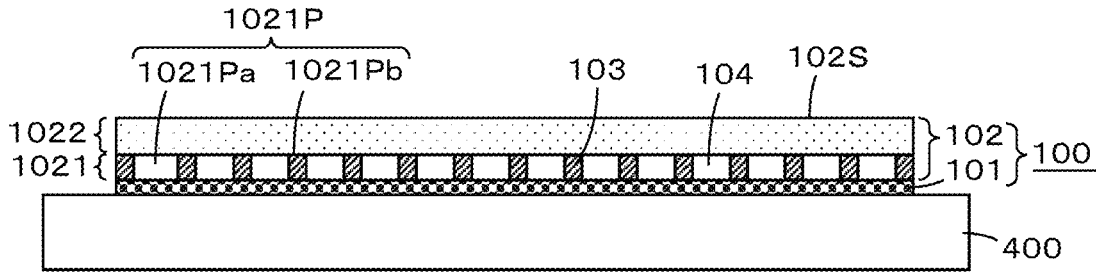
F I G . 9
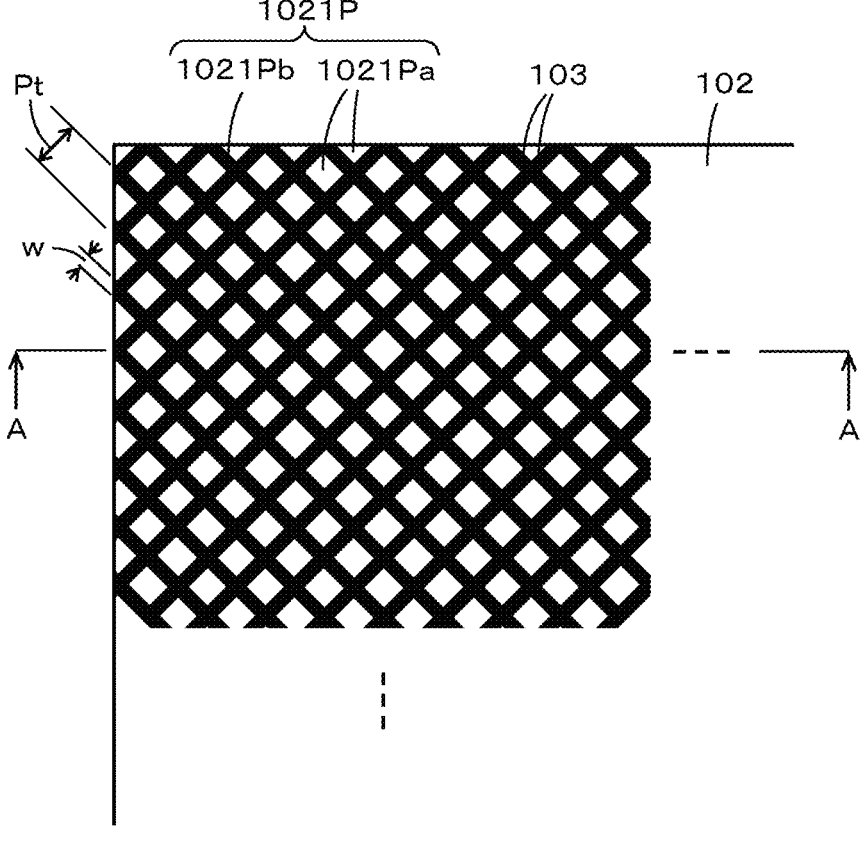

50gf, KINETIC FRICTION COEFFICIENT, POWER SPECTRUM, POM CORE, PVC HATCHING PATTERN

100gf, KINETIC FRICTION COEFFICIENT, POWER SPECTRUM, POM CORE, PVC HATCHING PATTERN

200gf, KINETIC FRICTION COEFFICIENT, POWER SPECTRUM, POM CORE, PVC HATCHING PATTERN

F I G . 1 4 A
50gf, KINETIC FRICTION COEFFICIENT, POWER SPECTRUM, KOKUYO NO-836AT (1pcs)_uni05HB
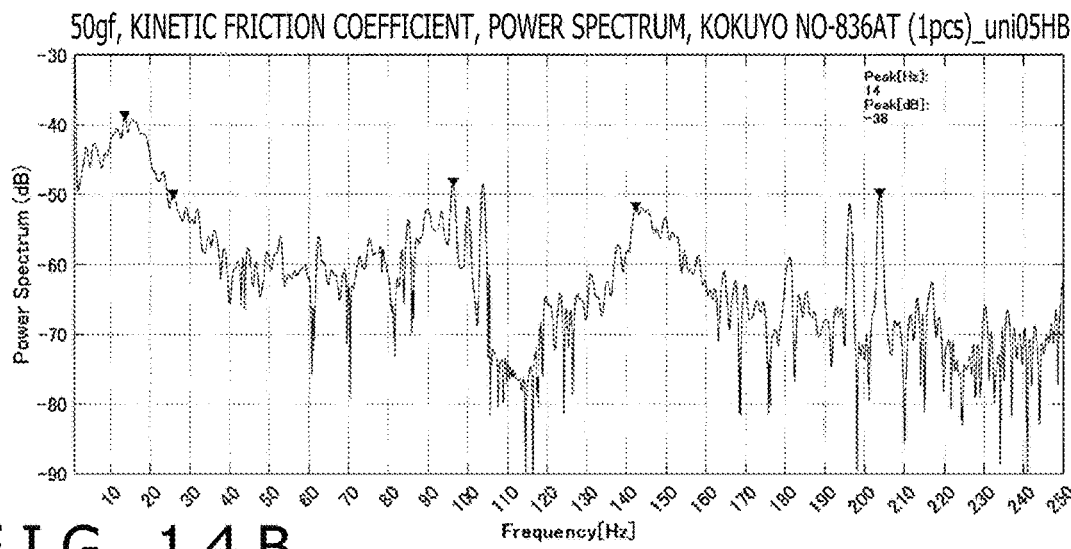
F I G . 1 4 B
100gf, KINETIC FRICTION COEFFICIENT, POWER SPECTRUM, KOKUYO NO-836AT (1pcs)_uni05HB
F I G . 1 4 C
200gf, KINETIC FRICTION COEFFICIENT, POWER SPECTRUM, KOKUYO NO-836AT (1pcs)_uni05HB
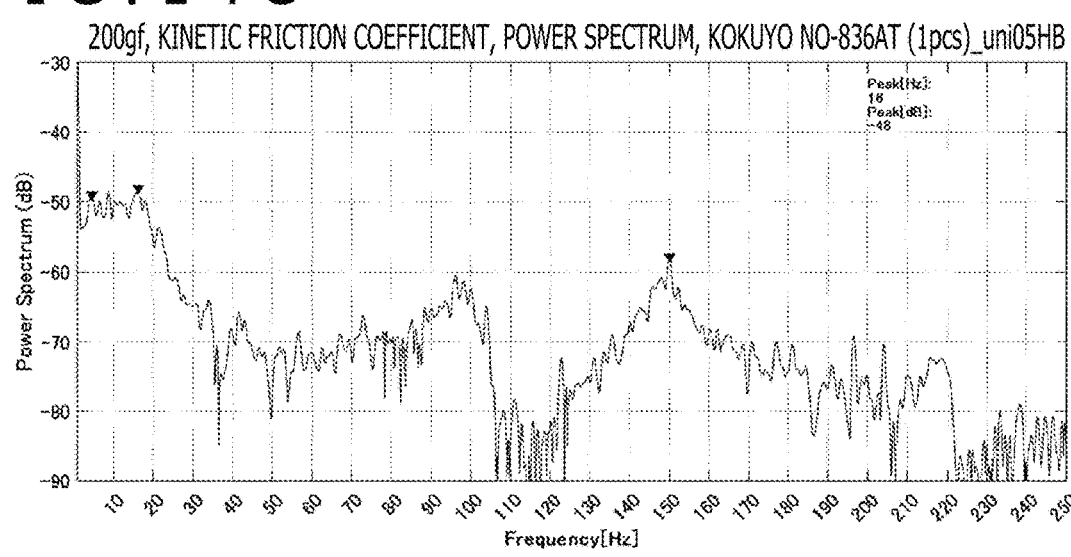

F I G . 1 8 A
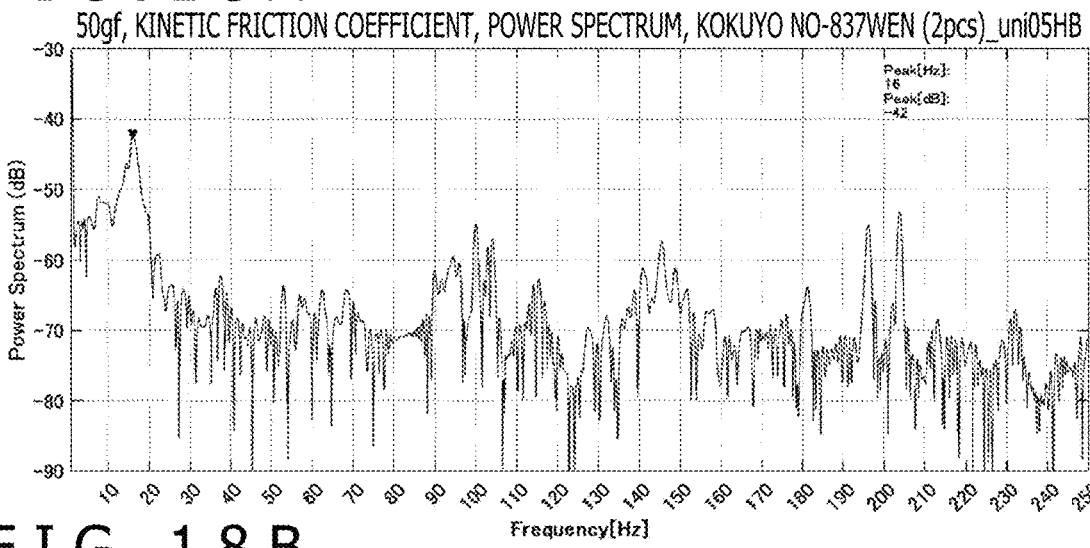
F I G . 1 8 B
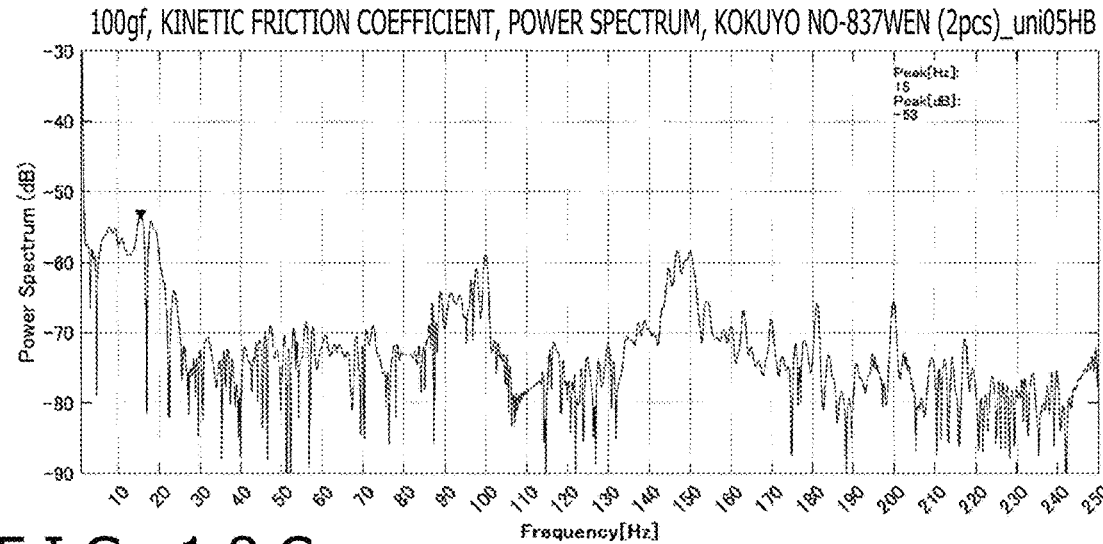
F I G . 1 8 C
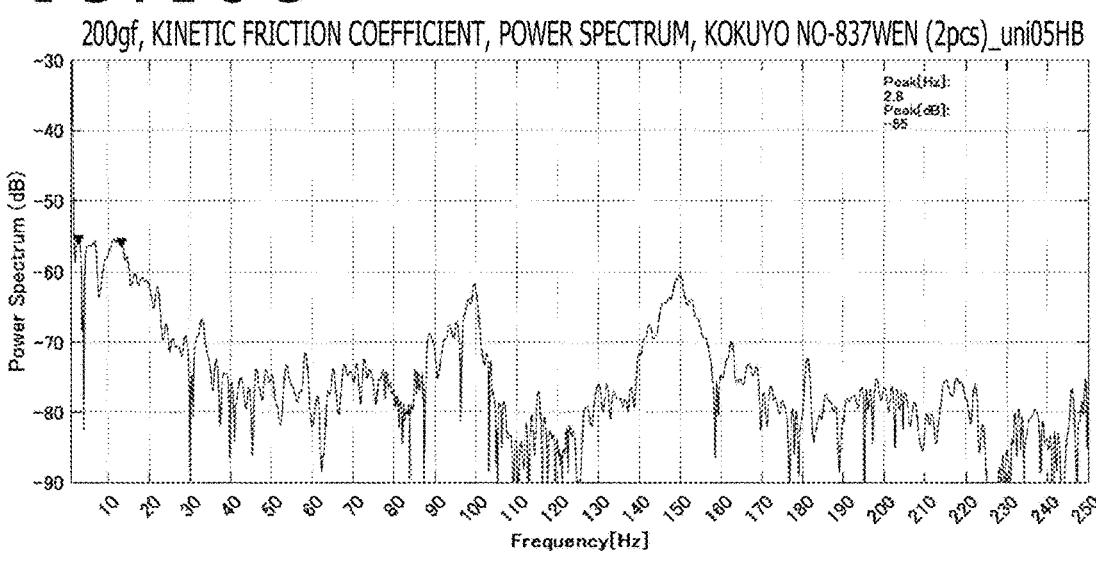

F I G . 2 0
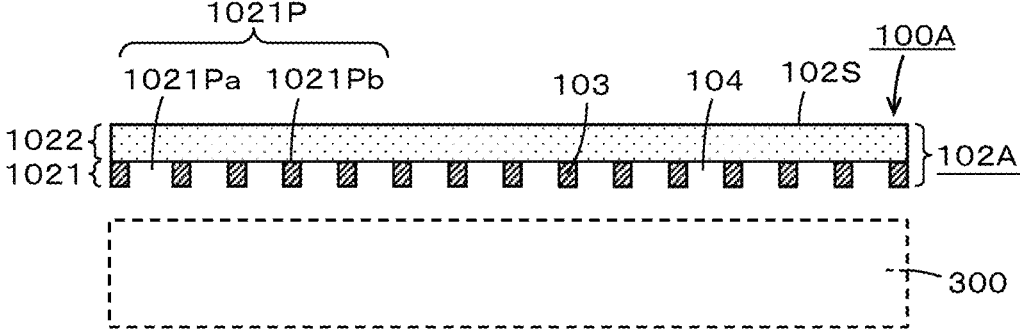
F I G . 2 1
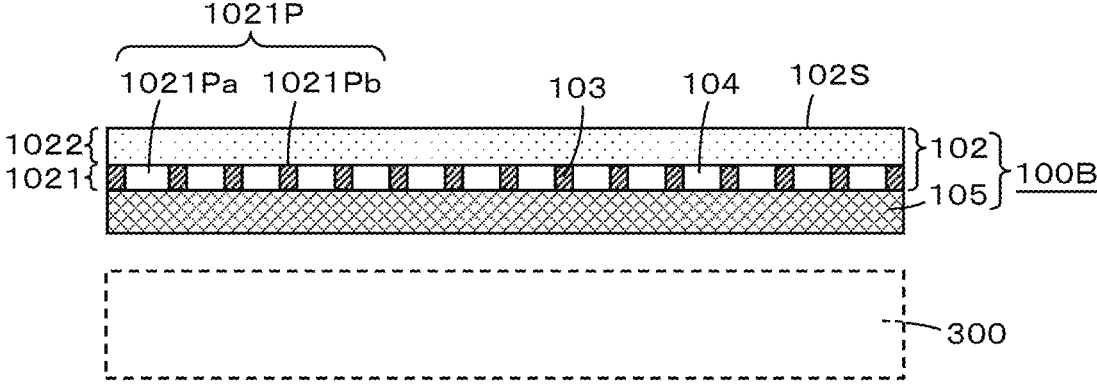
F I G . 2 2
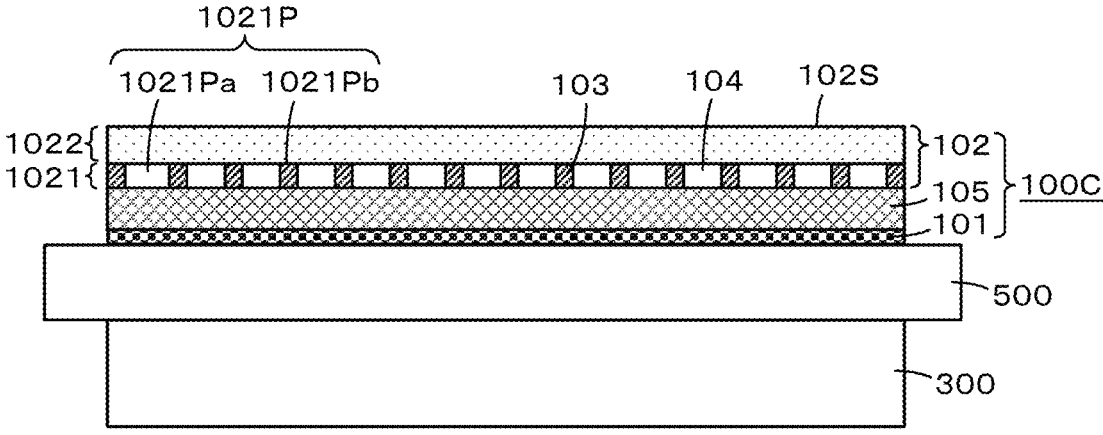

PEN INPUT DEVICE SHEET WITH ELASTIC LAYER HAVING RECESSED PROTRUDING PATTERN FACING A POSITION DETECTING DEVICE

BACKGROUND

Technical Field

This disclosure relates to a pen input device sheet that is used for a pen input device and comes into contact with the pen tip of an electronic pen.

Description of the Related Art

Recently, pen input devices have come to be used as input devices for pieces of small-size electronic equipment such as a highly-functional mobile phone terminal called a smartphone and a pad-type terminal. The pen input device is composed of an electronic pen and a position detecting device that detects an indicated position indicated by this electronic pen. Reduction in the thickness of the electronic pen used for such a pen input device for small-size electronic equipment has been advanced, and the electronic pen having a pen tip with a diameter similar to that of the pen tip of a commercially-available ballpoint pen has also been increasing.

Such a background has also produced demands for the electronic pen to be able to perform input with a writing feel as the one when writing on paper is executed with a pencil or ballpoint pen, for example. For this purpose, as related arts, sticking a sheet (pen input device sheet) for which contrivance is made to develop a writing feel as the above-described one onto a pen indication input surface of a pen input device has been executed.

For example, pen input device sheets (films) in which a recessed-protruding shape of a sheet surface is controlled to adjust a writing feel have been proposed in Patent Document 1 (Japanese Patent Laid-open No. 2014-137640) and Patent Document 2 (Japanese Patent Laid-open No. 2014-149817). Moreover, a pen input device sheet (film) in which coating with soft resin is executed for a sheet surface to develop a writing feel has been proposed in Patent Document 3 (Japanese Patent Laid-open No. 2006-119772).

Further, Patent Document 4 (Japanese Patent Laid-open No. 2018-173905) has proposed a writing feel improving sheet that includes a base, a writing feel improving layer with which a touch pen comes into contact, and a light diffusion layer disposed between the base and the writing feel improving layer and in which the writing feel improving layer has spherical fine particles and the writing feel improving layer has the following predetermined limited condition.

Specifically, the writing feel improving sheet of Patent Document 4 has a value of at least 1.2 and at most 10 as the amplitude in a range of the frequency of 1 to 2 Hz acquired from a frequency-amplitude chart obtained by performing a Fourier transform of a chart of movement distance-pen tip resistance obtained by bringing, in the perpendicular direction, the pen tip of a touch pen with a hard felt core with a pen tip diameter of 0.5 mm into contact with the surface of the writing feel improving layer with which the touch pen comes into contact, under a pressurization condition with a load of 3.92 N, and measuring the pen tip resistance while moving the touch pen in any one direction parallel to the surface of the writing feel improving layer at a speed of 100 mm/minutes.

Incidentally, there is a demand to select a combination of a writing material and a writing medium of a target having a writing feel sought in writing input with an electronic pen and obtain a writing feel equivalent or close to the writing feel available in the combination of the writing material and the writing medium of the target. For example, there is a demand to obtain, when writing input with an electronic pen is made, a writing feel equivalent or close to one when writing input is made to paper such as copy paper with a pencil.

However, in the method in which the writing feel is adjusted by controlling the recessed-protruding shape of a surface of the pen input device sheet, described in Patent Document 1 and Patent Document 2, there is a problem that it is impossible to reproduce a feeling (writing feel or sense of writing pressure) due to paper being hollowed when writing is executed on the paper with a pen. In addition, Patent Document 1 and Patent Document 2 include no concept of obtaining a writing feel equivalent or close to the writing feel when writing input is made to a predetermined writing medium with a predetermined writing material, and thus involve a problem that it is impossible to solve the above-described problem.

Moreover, also in the method in which coating with soft resin is executed for a surface, described in Patent Document 3, there is no concept of obtaining a writing feel equivalent or close to the writing feel when writing input is made to a predetermined writing medium with a predetermined writing material. Thus, there is a problem that it is impossible to solve the above-described problem.

Further, for the writing feel improving sheet described in Patent Document 4, criteria are set for a sense of resistance and smoothness as a writing feel when writing input is made with the touch pen with the hard felt core with the pen tip diameter of 0.5 mm, and the configuration is made to obtain a favorable value as a sensory evaluation in accordance with the criteria. However, Patent Document 4 also does not have the concept of obtaining a writing feel equivalent or close to the writing feel when writing input is made to a predetermined writing medium with a predetermined writing material, and thus involves a problem that it is impossible to solve the above-described problem.

BRIEF SUMMARY

In view of the above point, this disclosure intends to provide a pen input device sheet configured to allow obtainment of a writing feel equivalent or close to the writing feel available in a combination of a writing material and a writing medium selected as a target when writing input is made with an electronic pen.

In order to solve the above-described problem, there is provided a pen input device sheet disposed over a position detection region of a position detecting sensor. The pen input device sheet has an elastic material layer that is composed of a plurality of layer portions stacked in a thickness direction of the pen input device sheet and has elasticity. In operation, a side opposite of a side of the position detecting sensor in the elastic material layer is a writing input surface to which writing input with an electronic pen is made. The pen input device sheet is configured such that a vibration frequency characteristic of a kinetic friction coefficient when the electronic pen is moved at a predetermined speed on the writing input surface of the pen input device sheet matches the vibration frequency characteristic of the kinetic friction coefficient when a predetermined writing material is moved at the predetermined speed on a predetermined writing medium.

According to the pen input device sheet with the above-described configuration, when writing input is made with the electronic pen, what exhibits a writing feel equivalent or close to the writing feel available in the combination of the writing material and the writing medium desired by the user can be obtained.

BRIEF DESCRIPTION OF THE SEVERAL VIEWS OF THE DRAWINGS

FIGS. 4A to 4C are diagrams illustrating an example of vibration frequency characteristics of the kinetic friction coefficient in one example of a writing material and a writing medium employed as a target for an embodiment of the pen input device sheet according to this disclosure;

FIG. 8 is a sectional view for explaining a configuration example of the embodiment of the pen input device sheet according to this disclosure;

FIG. 9 is a diagram for explaining the major part of the configuration example of the embodiment of the pen input device sheet according to this disclosure;

FIGS. 14A to 14C are diagrams illustrating an example of the vibration frequency characteristics of the kinetic friction coefficient in one example of the writing material and the writing medium employed as the target for the embodiment of the pen input device sheet according to this disclosure;

FIGS. 18A to 18C are diagrams illustrating an example of the vibration frequency characteristics of the kinetic friction coefficient in the one example of the writing material and the writing medium employed as the target for the embodiment of the pen input device sheet according to this disclosure;

FIG. 20 is a sectional view for explaining a first modification example of the configuration example of the embodiment of the pen input device sheet according to this disclosure;

FIG. 21 is a sectional view for explaining a second modification example of the configuration example of the embodiment of the pen input device sheet according to this disclosure;

FIG. 22 is a sectional view for explaining a third modification example of the configuration example of the embodiment of the pen input device sheet according to this disclosure;

DETAILED DESCRIPTION

Configuration Example of Pen Input Device

Prior to description of embodiments of a pen input device sheet according to this disclosure, a configuration example of one example of a pen input device to which this disclosure is applied will be described.

Figure 1:
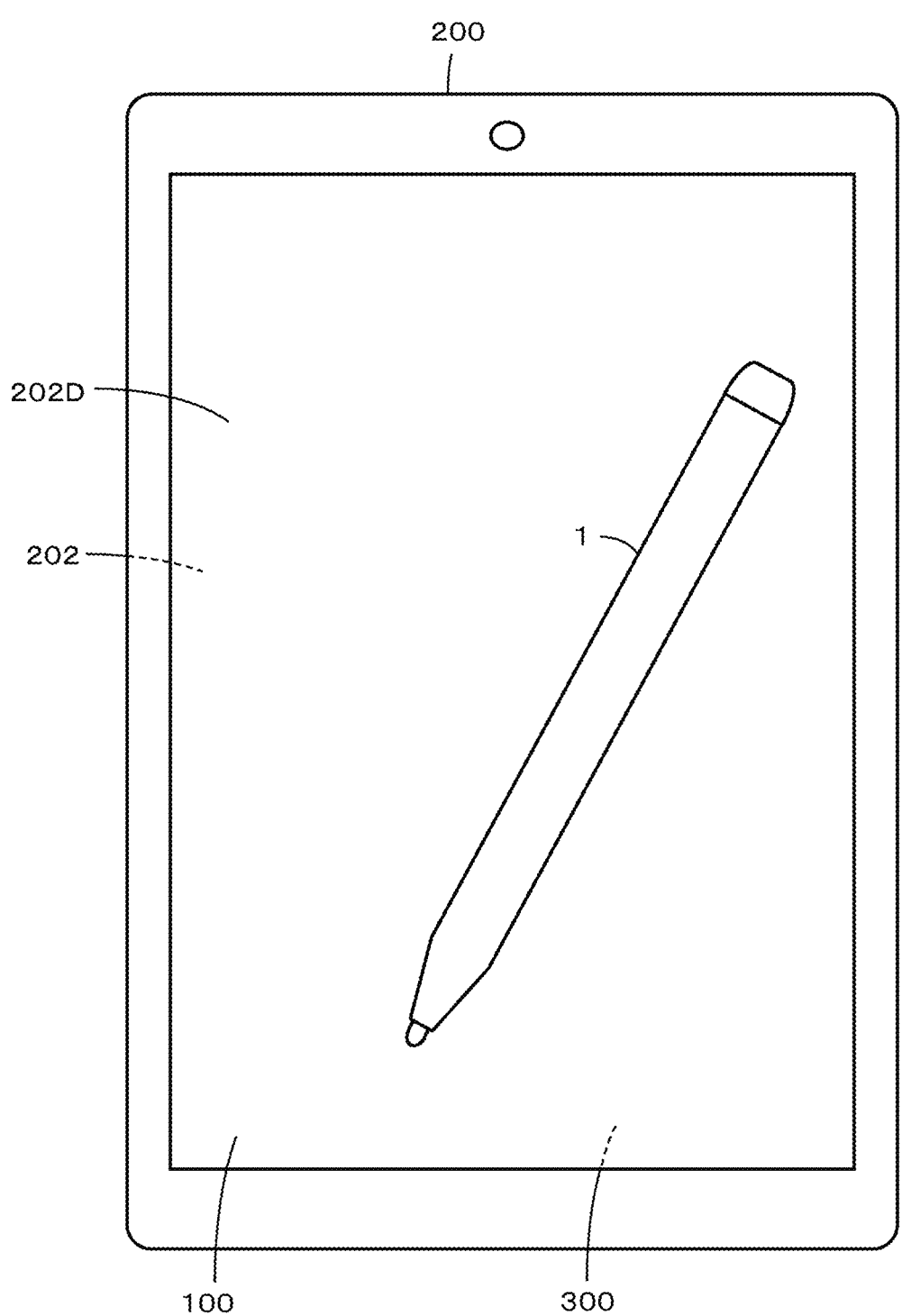
FIG. 1 is a diagram for explaining one example of a pen input device for which a pen input device sheet according to this disclosure is used.

FIG. 1 illustrates one example of a tablet-type information terminal 200 as one example of the pen input device. In this example, the tablet-type information terminal 200 includes a display device 202, a liquid crystal display (LCD) in this example, in a terminal casing and includes a position detecting device 300 of an electromagnetic induction system under (on the back surface side of) a display screen 202D of the display device 202. When the tablet-type information terminal 200 does not include the display device 202, the tablet-type information terminal 200 is a pen tablet-type terminal and includes the position detecting device 300 under a top plate (upper surface plate configuring an input surface of the pen tablet-type terminal) of the terminal casing.

In the case of the example of FIG. 1, although illustration is omitted in FIG. 1, the position detecting device 300 includes a position detecting sensor of an electromagnetic induction system having a position detection region with a size corresponding to a display region of the display screen 202D of the display device 202. The position detecting sensor is disposed in the state in which the display region of the display screen 202D and the position detection region overlap with each other. Thus, the tablet-type information terminal 200 of this example is configured in such a manner that almost the whole of the display region of the display screen 202D is the position detection region of the position detecting sensor.

The position detecting sensor may be disposed in such a manner that the position detection region corresponds to not almost the whole of the display region of the display screen 202D but a partial region in the display region.

Further, the tablet-type information terminal 200 of this example has an electronic pen 1 that executes position indication for the position detecting sensor of the position detecting device 300 by an electromagnetic induction system. Moreover, a pen input device sheet 100 of this disclosure is disposed to be stuck onto the display screen 202D of the tablet-type information terminal 200. In this example, almost the whole of the display region of the display screen 202D is employed as the position detection region of the position detecting sensor. Thus, the pen input device sheet 100 is disposed to cover the whole of the display region of the display screen 202D. Further, the exposed surface of this pen input device sheet 100 becomes an input surface of position indication by the electronic pen 1, that is, a writing input surface.

It is obvious that the pen input device sheet of this disclosure may be used also in the pen tablet-type terminal that does not include the display device 202.

A user brings a tip part (pen tip) of a core body of the electronic pen 1 into contact with the pen input device sheet 100 and executes input operation of drawing a line on the pen input device sheet 100, or the like, in the state in which a predetermined writing pressure is applied to the pen tip. The position detecting device 300 detects the drawing input on the pen input device sheet 100 by the electronic pen 1 and detects the writing pressure of the electronic pen 1 in the drawing input.

Description of Mechanical Configuration Example of Electronic Pen 1

Figure 2:
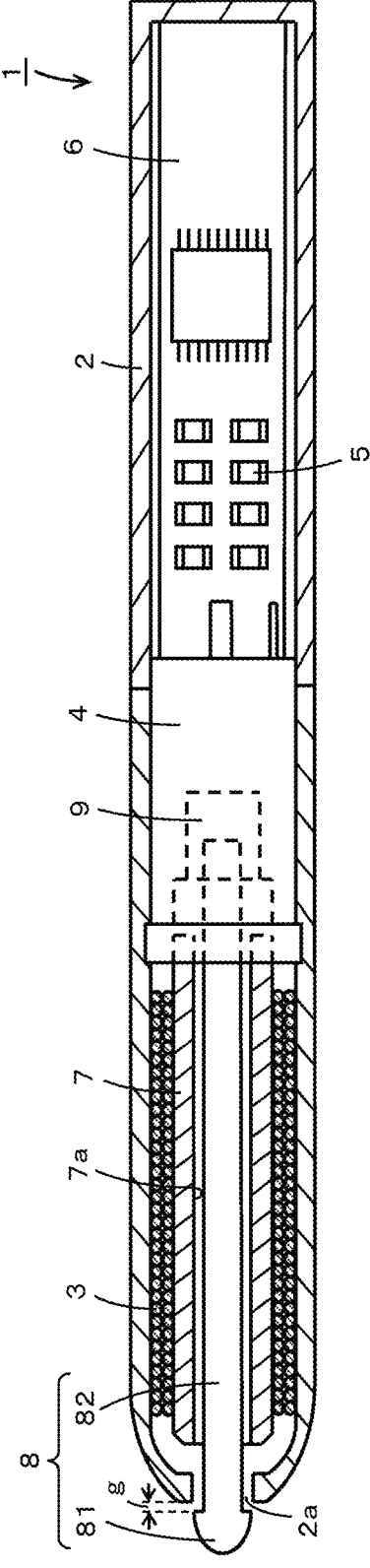
FIG. 2 is a diagram for explaining one example of an electronic pen with which writing input is made on the pen input device sheet according to this disclosure.

FIG. 2 illustrates the outline of the electronic pen 1 used with the tablet-type information terminal 200 of this example. The electronic pen 1 of this example represents the case of an electronic pen of an electromagnetic induction system. In a hollow part of a casing 2 with a cylindrical shape, a coil 3 for position detection, a writing pressure detecting part 4, and a printed board 6 on which electronic parts such as a capacitor 5 that configures a resonant circuit with the coil 3 are mounted are sequentially lined up in the axial center direction and are housed.

The coil 3 is wound around a ferrite core 7 as an example of a magnetic core having a through-hole 7a in the axial center direction and is housed near an opening 2a on the pen tip side in the casing 2. The writing pressure detecting part 4 includes a fitting part 9 into which an axial center part 82 of a core body 8 is fitted.

In this example, the core body 8 has a configuration in which a tip part 81 serving as the pen tip and the axial center part 82 are integrally coupled. The core body 8 is inserted into the casing 2 from the side of the axial center part 82 through the opening 2a and is made to penetrate through the through-hole 7a of the ferrite core 7. Further, an end part of the axial center part 82 of the core body 8 is fitted into the fitting part 9 provided in the writing pressure detecting part 4 and is held. When the end part of the axial center part 82 is fitted into the fitting part 9, the tip part 81 of the core body 8 is set to such a state as to protrude to the external from the opening 2a of the casing 2 as illustrated in FIG. 2.

In the example of FIG. 2, the writing pressure detecting part 4 is made to have a configuration of a variable-capacitance capacitor that detects the writing pressure applied to the tip part 81 of the core body 8 as change in the capacitance, and configures the resonant circuit with the coil 3 and the capacitor 5 through electrical connection in the printed board 6.

The electronic pen 1 of the electromagnetic induction system in this example executes interaction of a signal with the position detecting sensor of the position detecting device 300 by the resonant circuit. According to this, the position detecting device 300 detects the coordinates of a position indicated by the electronic pen 1.

The writing pressure detecting part 4 receives a pressure in the axial center direction regarding the core body 8 through the fitting part 9 and detects the pressure in the axial center direction as change in the capacitance. Moreover, in the electronic pen 1 in this example, the resonant frequency of the resonant circuit changes by this change in the capacitance. The position detecting device 300 detects the writing pressure applied to the tip part 81 of the core body 8 of the electronic pen 1 by detecting this change in the resonant frequency.

Circuit Configuration for Position Detection and Writing Pressure Detection in Position Detecting Device Used with Electronic Pen 1

Next, with reference to FIG. 3, description will be made about a circuit configuration example and operation thereof regarding the position detecting device 300 that executes detection of a position indicated by the above-described electronic pen 1 and detection of the writing pressure (=load) applied to the electronic pen 1.

Figure 3:
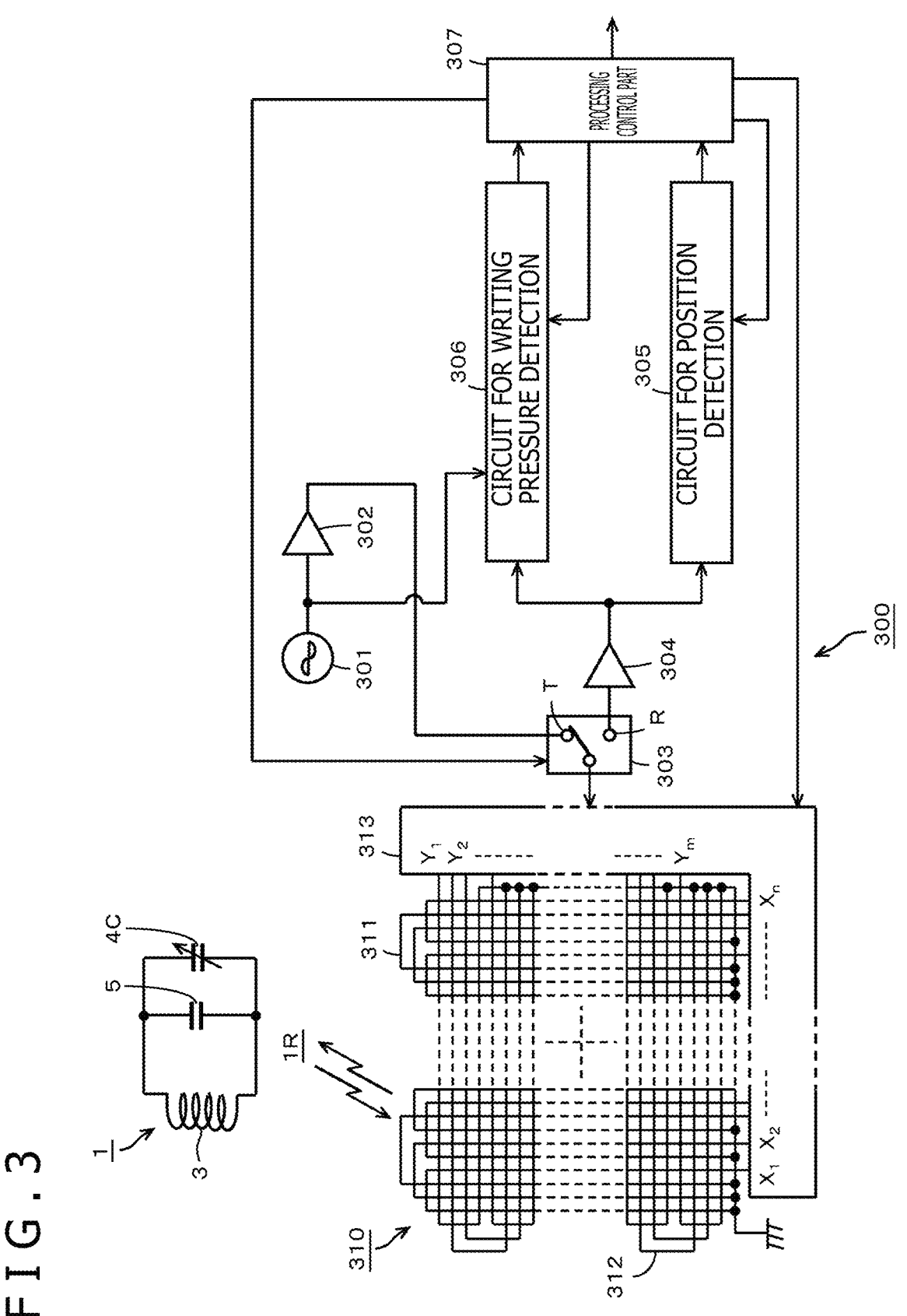
FIG. 3 is a diagram for explaining a circuit configuration example of a position detecting device of the pen input device for which the pen input device sheet according to this disclosure is used.

As illustrated in FIG. 3, in the electronic pen 1, one end part and the other end part of the coil 3 are connected to the capacitor 5, and a variable-capacitance capacitor 4C configured by the writing pressure detecting part 4 is connected in parallel to the coil 3 and the capacitor 5, so that a resonant circuit 1R is configured.

The position detecting device 300 of the electromagnetic induction system in this embodiment transmits a signal to the electronic pen 1 by electromagnetic induction coupling.

The electronic pen 1 returns the signal received from the position detecting device 300, through the resonant circuit 1R.

The position detecting device 300 receives the returned signal from the resonant circuit 1R of the electronic pen 1 by electromagnetic induction coupling and detects a position on the sensor indicated by the electronic pen 1 from a position on the sensor at which the received signal is detected. In addition, the position detecting device 300 detects a change in the resonant frequency by detecting a phase change of the signal received from the resonant circuit 1R of the electronic pen 1 by electromagnetic induction coupling, and detects the writing pressure applied to the tip part 81 of the core body 8 of the electronic pen 1.

In the position detecting device 300, an X-axis direction loop coil group 311 and a Y-axis direction loop coil group 312 are stacked, and a position detecting sensor 310 composed of position detecting coils is formed. Moreover, in the position detecting device 300, a selection circuit 313 to which the X-axis direction loop coil group 311 and the Y-axis direction loop coil group 312 are connected is disposed. This selection circuit 313 sequentially selects one loop coil in the two loop coil groups 311 and 312.

Further, disposed in the position detecting device 300 are an oscillator 301, a current driver 302, a switching connection circuit 303, a receiving amplifier 304, a circuit 305 for position detection, a circuit 306 for writing pressure detection, and a processing control part 307. The processing control part 307 is configured by a microcomputer. The processing control part 307 controls selection of the loop coil in the selection circuit 313 and switching of the switching connection circuit 303 and controls processing timings in the circuit 305 for position detection and the circuit 306 for writing pressure detection.

The oscillator 301 generates an alternating-current signal with a frequency f0. Further, the oscillator 301 supplies the generated alternating-current signal to the current driver 302 and the circuit 306 for writing pressure detection. The current driver 302 converts the alternating-current signal supplied from the oscillator 301 to a current and sends out the current to the switching connection circuit 303. The switching connection circuit 303 switches the connection target (transmission-side terminal T, reception-side terminal R) to which the loop coil selected by the selection circuit 313 is connected, by control from the processing control part 307. In these connection targets, the transmission-side terminal T is connected to the current driver 302, and the reception-side terminal R is connected to the receiving amplifier 304.

An induced voltage generated in the loop coil selected by the selection circuit 313 is sent to the receiving amplifier 304 through the selection circuit 313 and the switching connection circuit 303. The receiving amplifier 304 amplifies the induced voltage supplied from the loop coil and sends out the amplified voltage to the circuit 305 for position detection and the circuit 306 for writing pressure detection.

An induced voltage is generated in each loop coil of the X-axis direction loop coil group 311 and the Y-axis direction loop coil group 312 by radio waves transmitted from the electronic pen 1. The circuit 305 for position detection executes detection of the induced voltage generated in the loop coil, that is, a received signal, and converts a detection output signal thereof to a digital signal to output it to the processing control part 307. The processing control part 307 calculates the coordinate values of the indicated position in the X-axis direction and the Y-axis direction regarding the electronic pen 1 in reference to the digital signal from the circuit 305 for position detection, that is, the level of the voltage value of the induced voltage generated in each loop coil.

Meanwhile, the circuit 306 for writing pressure detection executes synchronous detection of an output signal of the receiving amplifier 304 with the alternating-current signal from the oscillator 301, obtains a signal at a level according to the phase difference (frequency deviation) between them, and converts the signal according to the phase difference (frequency deviation) to a digital signal to output it to the processing control part 307. The processing control part 307 detects the pressure applied to the electronic pen 1, in reference to the level of the digital signal from the circuit 306 for writing pressure detection, that is, the signal according to the phase difference (frequency deviation) between the transmitted radio wave and the received radio wave.

Description of Outline of Creation Procedure of Pen Input Device Sheet According to this Disclosure Prior to description of a configuration example of the embodiments of the pen input device sheet according to this disclosure, the outline of a creation procedure of the pen input device sheet according to this disclosure will be described.

(1) First, a creator of the pen input device sheet according to this disclosure selects a combination of a writing material and a writing medium of a target having the writing feel desired to be obtained with an electronic pen.

(2) Next, the selected writing material is caused to make, for example, a linear movement on the selected writing medium in a predetermined direction at a predetermined speed in the state in which a predetermined writing pressure is applied, and the kinetic friction coefficient on that occasion is measured. At this time, the kinetic friction coefficient is measured as time-series change (vibration change) when the time elapse in the linear movement is plotted on the abscissa axis.

(3) Next, a Fourier transform of the time-series change of the kinetic friction coefficient obtained as the measurement result is performed to obtain the power spectrum of change (vibration) with respect to the time elapse of the kinetic friction coefficient, that is, the vibration frequency characteristic of the kinetic friction coefficient. Then, in this embodiment, the frequency distribution of the magnitude of the vibration of the kinetic friction coefficient in the obtained vibration frequency characteristic of the kinetic friction coefficient and a frequency at which the magnitude of the vibration is prominent from adjacent frequency ranges are detected, and the frequency that exhibits the peak of the magnitude of the vibration prominent from a broad waveform of the frequency distribution of the magnitude of the vibration is detected. The frequency at which the magnitude of the vibration is prominent does not appear depending on the combination of the writing material and the writing medium in some cases. In such a combination, the maximum value that is the apex of a mountain part configuring the frequency distribution of the magnitude of the vibration is the peak of the magnitude of the vibration.

(4) Next, the pen input device sheet of this embodiment is created by configuring the pen input device sheet in such a manner as to cause the pen input device sheet to have the vibration frequency characteristic of the kinetic friction coefficient that matches the vibration frequency characteristic of the kinetic friction coefficient when the selected writing material is moved on the selected writing medium at the predetermined speed in the case of the combination of the selected writing material and writing medium, obtained in the above manner.

That is, the pen input device sheet is configured in such a manner that the vibration frequency characteristic of the kinetic friction coefficient when the electronic pen is moved on the writing input surface of the created pen input device sheet at the same speed as that when the measurement of the kinetic friction coefficient has been executed with the combination of the selected writing material and writing medium matches the vibration frequency characteristic of the kinetic friction coefficient obtained with the combination of the selected writing material and writing medium.

In this case, as the method for causing the two vibration frequency characteristics of the kinetic friction coefficient to match each other, in this embodiment, in particular, the frequency that exhibits the peak of the magnitude of the vibration of the kinetic friction coefficient in the vibration frequency characteristic of the kinetic friction coefficient obtained regarding the pen input device sheet is made to fall within a range of $\pm\Delta$Hz from a frequency fp at which the peak of the magnitude of the vibration of the kinetic friction coefficient is present in the vibration frequency characteristic of the kinetic friction coefficient obtained with the combination of the selected writing material and writing medium.

Here, in this embodiment, the value of $\Delta$ in the frequency fp$\pm\Delta$Hz is settled according to the width of the writing pressure applied to the pen tip of the electronic pen 1 by the user in writing. Further, in view of the fact that there are various kinds of hardnesses of the tip part that comes into contact with the writing medium in the writing material, that is, the fact that there are several kinds of hardnesses of the core of the pencil in this embodiment, the value of $\Delta$ is settled in consideration of difference in the frequency that exhibits the peak depending on the difference in these several kinds of hardnesses. The difference in the hardness of the pen tip exists not only in the pencil but also in the fountain pen for example. In addition, difference exists in the size of the ball at the tip (thinness of the pen tip) also in the ballpoint pen. The value of $\Delta$ is settled according to these differences.

It could be confirmed, as sensory evaluation, that a writing feel equivalent or close to the writing feel available in the combination of the selected writing material and writing medium was obtained as described later when writing input with the electronic pen was made on the pen input device sheet created in this manner.

As described above, in the pen input device sheet of the above-described embodiment, attention is paid to the vibration frequency characteristic of the kinetic friction coefficient obtained in a combination of a writing material and a writing medium, and the pen input device sheet is configured in such a manner that the vibration frequency characteristic of the kinetic friction coefficient of the pen input device sheet of the embodiment matches the vibration frequency characteristic of the kinetic friction coefficient obtained in the combination of the selected writing material and writing medium of the target. This can obtain a writing feel equivalent or close to the writing feel available in the combination of the selected writing material and writing medium.

Further, in the pen input device sheet of the above-described embodiment, the pen input device sheet is configured in such a manner that the frequency having the peak of the magnitude of the vibration of the kinetic friction coefficient in the vibration frequency characteristic of the kinetic friction coefficient of the pen input device sheet 100 falls within the frequency range in which the peak of the magnitude of the vibration of the kinetic friction coefficient in the vibration frequency characteristic of the kinetic friction coefficient obtained under various writing pressures is present in the combination of the selected writing material and writing medium. Thus, a writing feel equivalent or close to the writing feel available in the combination of the selected writing material and writing medium can be obtained even when the writing pressure applied to the electronic pen in writing changes.

Moreover, in the pen input device sheet of the above-described embodiment, the pen input device sheet is configured in such a manner that the frequency having the peak of the magnitude of the vibration of the kinetic friction coefficient in the vibration frequency characteristic of the kinetic friction coefficient of the pen input device sheet 100 falls within the frequency range in which the peak of the magnitude of the vibration of the kinetic friction coefficient in the vibration frequency characteristic of the kinetic friction coefficient obtained depending on the difference in the hardness of the tip part that is the part that comes into contact with the writing medium in the selected writing material is present in the combination of the selected writing material and writing medium. Thus, a writing feel equivalent or close to the writing feel available in the combination of the selected writing material and writing medium can be obtained irrespective of the difference in the hardness of the core body of the electronic pen.

Configuration Example of Pen Input Device Sheet of First Embodiment

The pen input device sheet of the first embodiment corresponds to the case in which a combination of a writing material and a writing medium of a target having the writing feel desired to be obtained with the electronic pen is a combination of a pencil and paper.

Vibration Frequency Characteristic of Kinetic Friction Coefficient in Combination of Writing Material and Writing Medium of Target In this example, Hi-Uni Pencil made by MITSUBISHI PENCIL COMPANY, LIMITED was used as the pencil as an example of the writing material and copy paper was used as an example of the writing medium.

Further, the respective pencils in which the hardness of the core is 4B, 2B, HB, and 2H were moved on one piece of copy paper, and the kinetic friction coefficient on that occasion was measured. In this case, in the state in which three kinds of pressures, 50 gf, 100 gf, and 200 gf, were applied to the pencil as the writing pressure, the pencil was caused to make, for example, a linear movement on the copy paper at a speed of 10 mm/second, and the measurement was executed. The pencil was moved in the state of being inclined at an angle of approximately 45 to 60 degrees with respect to the plane of the copy paper. Next, a Fourier transform of the time-series change of the kinetic friction coefficient obtained as the measurement result was performed to obtain the power spectrum of change (vibration) with respect to the time elapse of the kinetic friction coefficient, that is, the vibration frequency characteristic of the kinetic friction coefficient.

The obtained vibration frequency characteristics of the kinetic friction coefficient are illustrated in FIGS. 4A to 7C. FIGS. 4A to 4C, 5A to 5C, 6A to 6C, and 7A to 7C illustrate the vibration frequency characteristics of the kinetic friction coefficient in the cases in which writing was executed with the pencil in which the hardness of the core was 4B, 2B, HB, and 2H, respectively.

Moreover, FIGS. 4A, 5A, 6A, and 7A, FIGS. 4B, 5B, 6B, and 7B, and FIGS. 4C, 5C, 6C, and 7C illustrate the vibration frequency characteristics of the kinetic friction coefficient in the cases in which 50 gf, 100 gf, and 200 gf, respectively, was applied to the pencil as the writing pressure.

When reference to FIGS. 4A, 5A, 6A, and 7A is made, it can be confirmed that the vibration frequency characteristics of the kinetic friction coefficient in the cases in which writing is executed on the copy paper with the pencil to which 50 gf is applied as the writing pressure are characteristics in which the peak of the magnitude of the vibration of the kinetic friction coefficient is exhibited at frequencies of 18 Hz, 20 Hz, 17 Hz, and 15 Hz with the pencil in which the hardness of the core is 4B, 2B, HB, and 2H, respectively. In general, the writing pressure when a user holds a pencil and executes writing on a writing medium is approximately 50 gf.

Figure 5A:
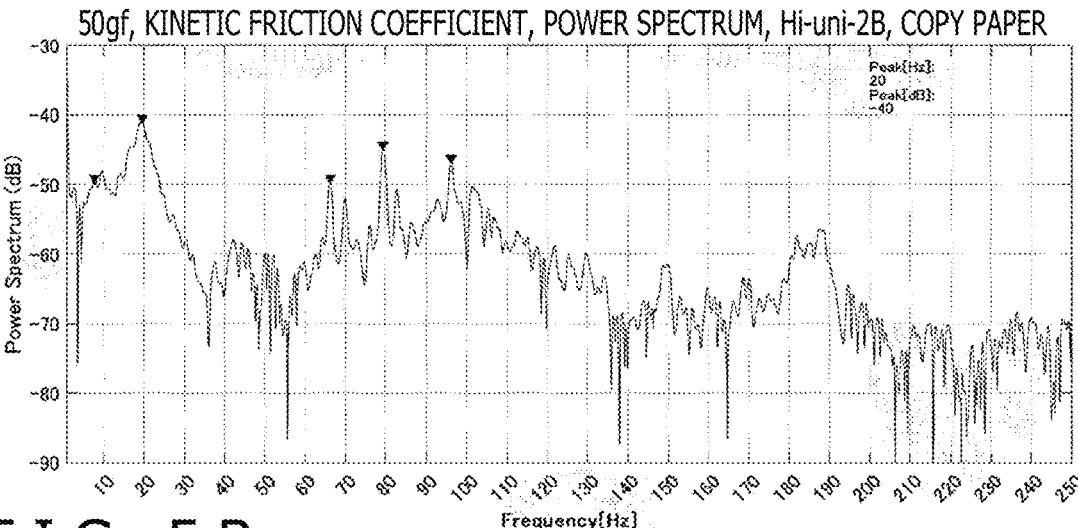
FIGS. 5A to 5C are diagrams illustrating an example of the vibration frequency characteristics of the kinetic friction coefficient in the one example of the writing material and the writing medium employed as the target for the embodiment of the pen input device sheet according to this disclosure.
Figure 5B:
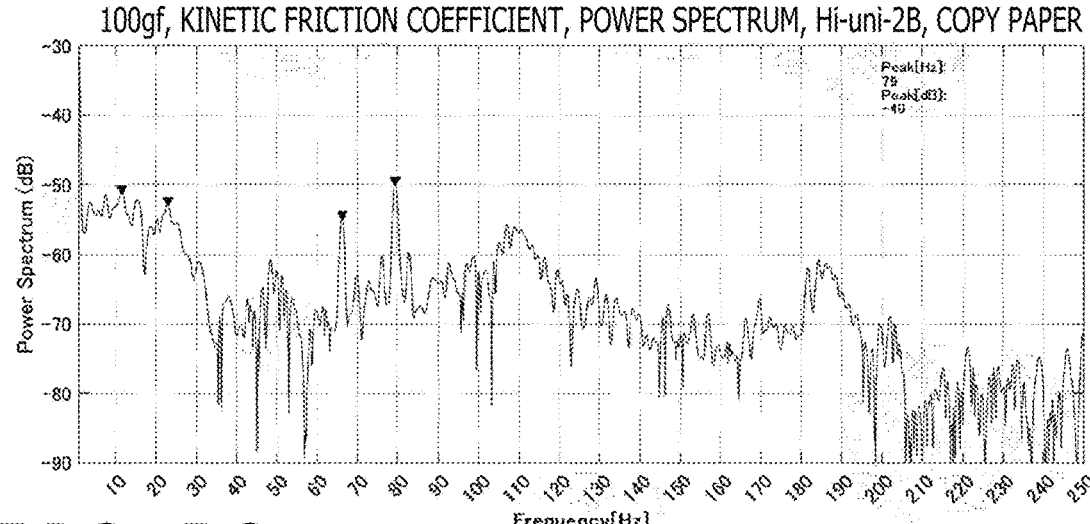

Reference to FIGS. 4B and 5B indicates that a frequency at which the magnitude of the vibration is prominent from adjacent frequency ranges is present at 60 Hz or higher. However, as a broad waveform over several tens of hertz in the frequency distribution of the magnitude of the vibration, a tendency of distribution of the power spectrum having the maximum value at a frequency of 35 Hz or lower is indicated. In particular, in writing by a soft core of a pencil, the core tip readily wears off in the process of the writing. At this time, the friction vibration of the writing is affected by vibration attributed to crushing of the core caused when the core wears off, and the frequency of the measured friction vibration is dispersed. From this, it can be confirmed that, as the peak of the magnitude of the vibration in the cases in which writing is executed on the copy paper with the pencil to which 100 gf is applied as the writing pressure, characteristics in which the peak of the magnitude of the vibration of the kinetic friction coefficient is exhibited at frequencies of 22 Hz and 12 Hz with the pencil in which the hardness of the core is 4B and 2B, respectively, are obtained.

Figure 5C:
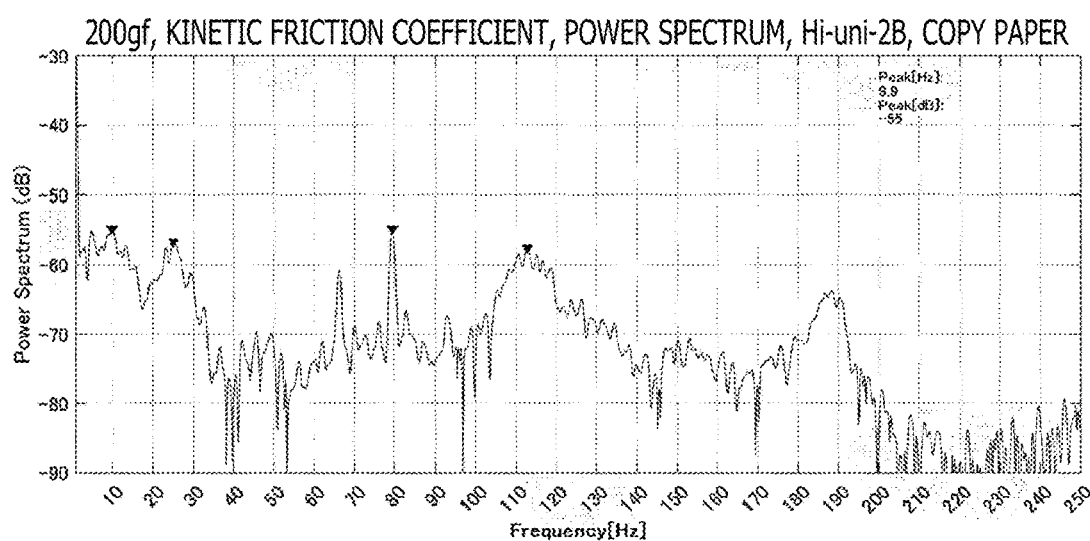

Further, when reference to FIGS. 4C and 5C is made, it can be confirmed that the vibration frequency characteristics of the kinetic friction coefficient in the cases in which writing is executed on the copy paper with the pencil to which 200 gf is applied as the writing pressure are characteristics in which the peak of the magnitude of the vibration of the kinetic friction coefficient is exhibited at frequencies of 8 Hz and 10 Hz with the pencil in which the hardness of the core is 4B and 2B, respectively.

Figure 6A:
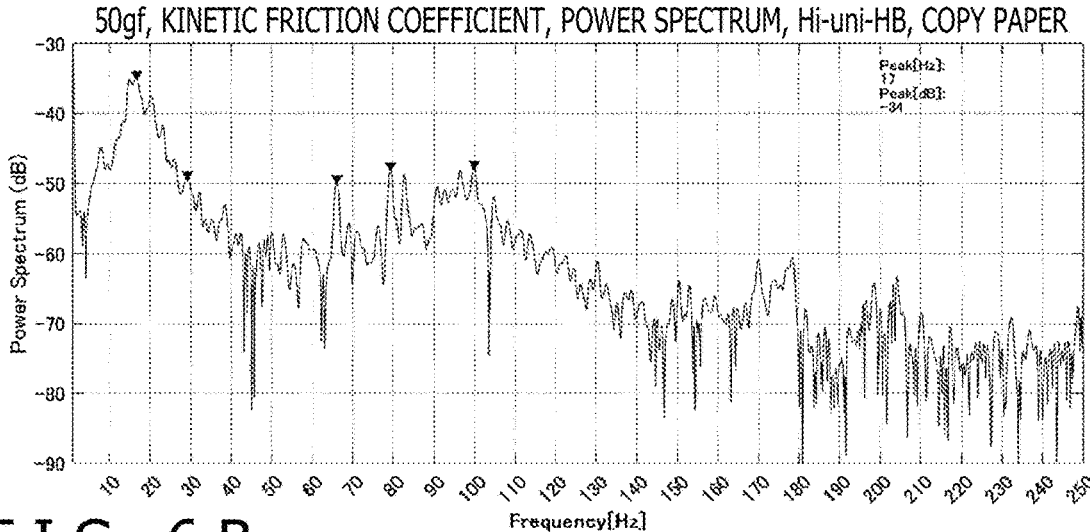
FIGS. 6A to 6C are diagrams illustrating an example of the vibration frequency characteristics of the kinetic friction coefficient in the one example of the writing material and the writing medium employed as the target for the embodiment of the pen input device sheet according to this disclosure.
Figure 6B:
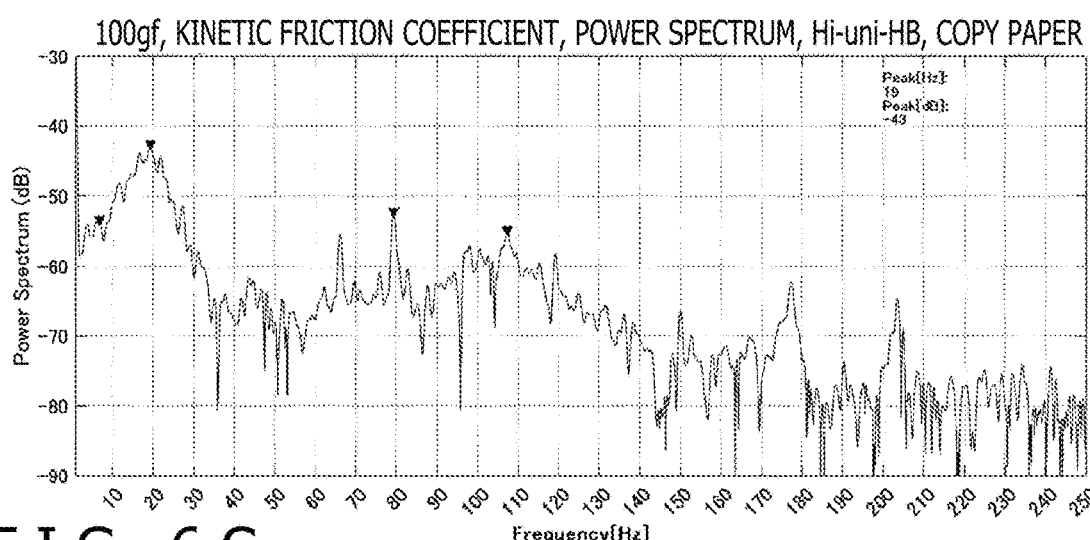
Figure 7A:
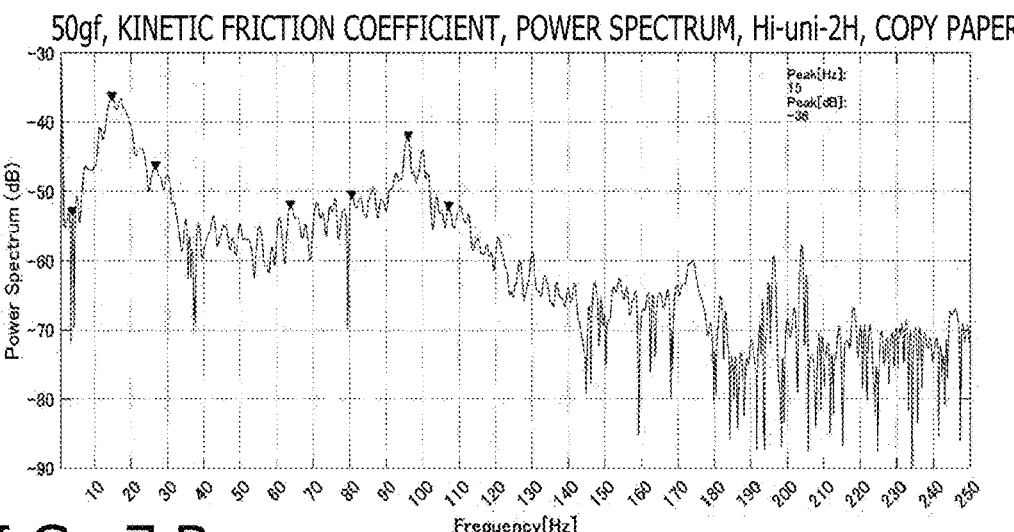
FIGS. 7A to 7C are diagrams illustrating an example of the vibration frequency characteristics of the kinetic friction coefficient in the one example of the writing material and the writing medium employed as the target for the embodiment of the pen input device sheet according to this disclosure.
Figure 7B:
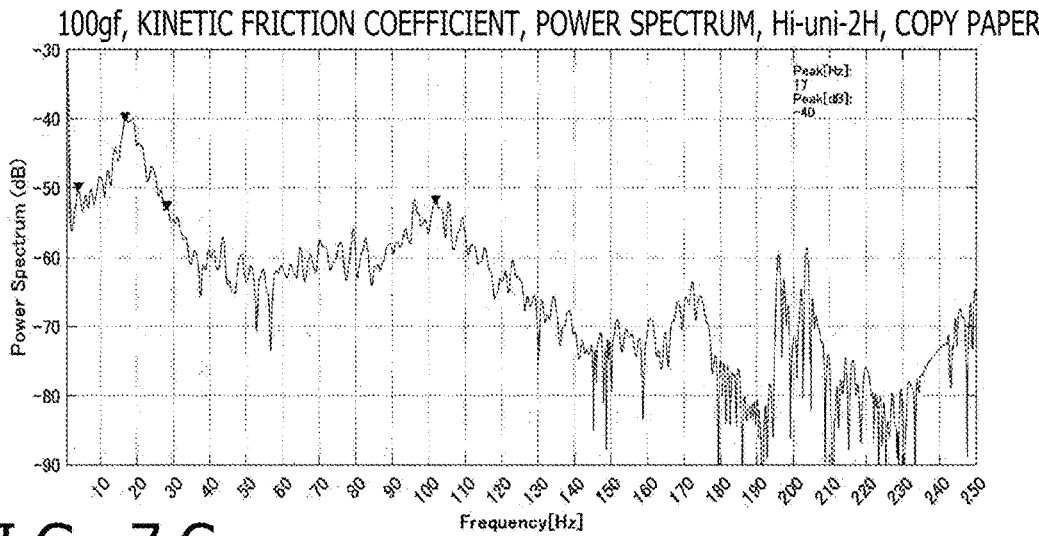

When a reference to FIGS. 6B and 7B is made, it can be confirmed that the vibration frequency characteristics of the kinetic friction coefficient in the cases in which writing is executed on the copy paper with the pencil to which 100 gf is applied as the writing pressure are characteristics in which the peak of the magnitude of the vibration of the kinetic friction coefficient is exhibited at frequencies of 19 Hz and 17 Hz with the pencil in which the hardness of the core is HB and 2H, respectively.

Figure 6C:
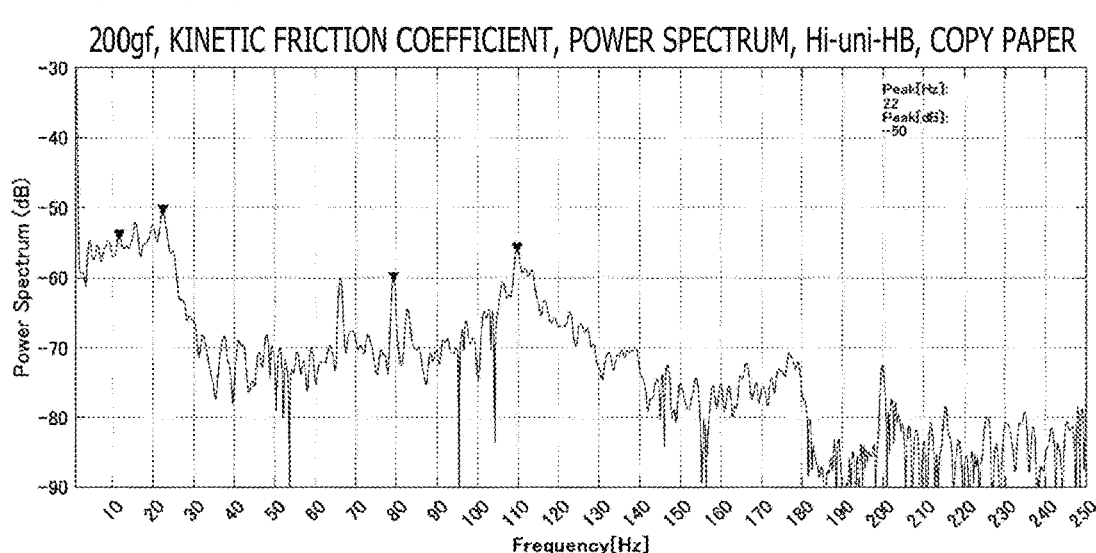
Figure 7C:
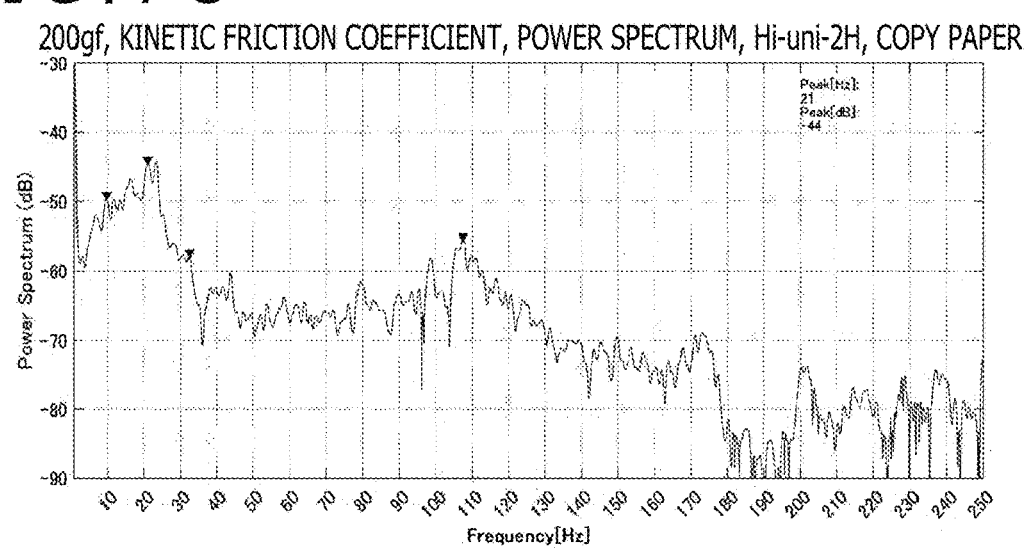

Moreover, when reference to FIGS. 6C and 7C is made, it can be confirmed that the vibration frequency characteristics of the kinetic friction coefficient in the cases in which writing is executed on the copy paper with the pencil to which 200 gf is applied as the writing pressure are characteristics in which the peak of the magnitude of the vibration of the kinetic friction coefficient is exhibited at frequencies of 22 Hz and 21 Hz with the pencil in which the hardness of the core is HB and 2H, respectively.

When reference to FIGS. 4B, 4C, 5B, 5C, 6B, 6C, 7B, and 7C is made, it can be confirmed that the vibration of the kinetic friction coefficient is more suppressed in the vibration frequency characteristic of the kinetic friction coefficient as the writing pressure applied to the pencil becomes higher and this tendency becomes weaker when the core of the pencil becomes harder.

From the above, it can be confirmed that, in this embodiment, the vibration frequency characteristics of the kinetic friction coefficient in the cases in which writing is executed on the copy paper with the pencil in which the core is harder than 2B in the state in which a writing pressure is applied in a range of 50 to 200 gf become characteristics in which the peak of the magnitude of the vibration of the kinetic friction coefficient is exhibited in a frequency range of 17 Hz±5 Hz.

Further, even in the cases in which the hardness of the core is 2B and 4B, the peak of the magnitude of the vibration of the kinetic friction coefficient is exhibited in a frequency range of 17 Hz±5 Hz as long as the writing pressure is in a light range as exemplified by a range of 50 to 100 gf. That is, the above-described ±Δ is set to ±Δ=±5 Hz in this embodiment.

With this frequency range, the characteristics in the cases in which the hardness of the core is 2B and 4B are not covered when the writing pressure exceeds 100 gf. However, by considering the hardness of the core body of the electronic pen 1, a writing feel similar to the writing feel available in the case of the combination of the pencil and the copy paper can be obtained in the pen input device sheet of this embodiment even when such a frequency range is employed. Moreover, without having to consider the hardness of the core body of the electronic pen 1, considering the fact that the writing pressure when writing is executed on the pen input device sheet 100 with the electronic pen 1 is approximately 50 gf in general, a writing feel similar to the writing feel available in the case of the combination of the pencil and the copy paper can be obtained in the pen input device sheet of this embodiment even when such a frequency range is employed.

In light of the above measurement result, in this first embodiment, the pen input device sheet 100 is configured in such a manner that the vibration frequency characteristic of the kinetic friction coefficient when writing is executed on the pen input device sheet 100 with the electronic pen 1 becomes one that matches the vibration frequency characteristic of the kinetic friction coefficient when writing is executed on the copy paper with the above-described pencil.

In this first embodiment, the pen input device sheet 100 is configured to have the peak of the magnitude of the vibration of the kinetic friction coefficient in a predetermined frequency range, a frequency range of 17 Hz±5 Hz in the case of this example, such that the vibration frequency characteristic of the kinetic friction coefficient regarding the pen input device sheet 100 when the electronic pen 1 is moved on the writing input surface of the pen input device sheet 100 at a speed of 10 mm/second as a predetermined speed in the state in which a predetermined writing pressure, for example, a writing pressure of 50 gf, is applied may match the vibration frequency characteristic of the kinetic friction coefficient when the pencil is moved on the copy paper under the same condition (see FIGS. 4A, 5A, 6A, and 7A). The writing pressure applied to the electronic pen 1 when the vibration frequency characteristic of the kinetic friction coefficient of the pen input device sheet 100 is obtained is not limited to 50 gf and may be either lower or higher than 50 gf.

A specific configuration example of the pen input device sheet 100 of the first embodiment for making such a configuration will be described below.

FIG. 8 is a diagram for explaining a configuration example of the pen input device sheet 100 of this first embodiment. The pen input device sheet 100 is illustrated by a sectional view here. In FIG. 8, the pen input device sheet 100 of this embodiment is fixed on a smooth glass plate 400 serving as a support body likened to a pen tablet terminal casing or a display device by a sheet-shaped adhesive layer 101. In FIG. 8, the position detecting device 300 is omitted. The above configuration makes it possible to obtain a writing effect similar to that when the pen input device sheet is disposed to be stuck onto the pen tablet terminal casing or the display device.

As illustrated in FIG. 8, the pen input device sheet 100 of this embodiment is composed of the adhesive layer 101 and an elastic material layer 102 disposed on this adhesive layer 101.

As the elastic material layer 102, a material having elasticity, in this example, a polyvinyl chloride (PVC) sheet having a film thickness of 0.1 mm, is used. This elastic material layer 102 is disposed on one surface of the sheet-shaped adhesive layer 101, and an exposed surface 102S on the opposite side of the side of the adhesive layer 101 in this elastic material layer 102 is used as a writing input surface to which writing input with the electronic pen 1 is made.

In this embodiment, the elastic material layer 102 is configured to have layer portions of a plurality of layers made into configurations (structures) different in the thickness direction thereof, in this example, a first layer portion 1021 on the side of the adhesive layer 101 and a second layer portion 1022 on the opposite side of the side of the adhesive layer 101. Here, as an example of the configurations (structures) different between the first layer portion 1021 and the second layer portion 1022, they are made different from each other in the density per unit volume and/or are made different from each other in the hardness per unit volume.

In the pen input device sheet 100 of the first embodiment in the example of FIG. 8, only a single PVC layer portion is employed as the second layer portion 1022 of the elastic material layer 102. Further, the first layer portion 1021 is made to have a configuration having a recessed-protruding pattern 1021P in which recessed parts 1021Pa and protruding parts 1021Pb are alternately repeated along the direction of a plane parallel to the sheet surface of the second layer portion 1022. In this example, a lattice-shaped pattern as the one illustrated in FIG. 9 is employed as this recessed-protruding pattern 1021P. Hence, in this example, the first layer portion 1021 and the second layer portion 1022 are made to have configurations different in both the density and the hardness per unit volume.

In this case, the tips of the protruding parts 1021Pb forming the recessed-protruding pattern 1021P of the first layer portion 1021 on the side of the adhesive layer 101 are made to abut against one surface of the adhesive layer 101. Moreover, in this example, the protruding parts 1021Pb of the recessed-protruding pattern 1021P of the first layer portion 1021 on the side of the adhesive layer 101 are formed of a hard member 103 composed of a material harder than the second layer portion 1022. In this example, this hard member 103 is composed of an ultraviolet (UV)-curable material. Although the hard member 103 is illustrated by a thick black line in order to illustrate the hard member 103 more clearly in FIG. 9, this hard member 103 may be a transparent material.

Further, in this example, the recessed parts 1021Pa of the recessed-protruding pattern 1021P of the first layer portion

1021 on the side of the adhesive layer 101 are spaces that are not filled with a material and are made to have a configuration filled with air.

One example of a manufacturing method of the pen input device sheet 100 of this example is as follows. On one surface of the second layer portion 1022 with a PVC sheet shape, a lattice-shaped pattern corresponding to the lattice-shaped pattern of the recessed-protruding pattern 1021P is formed as illustrated in FIG. 9 by UV-curable ink (ink of a UV-curable type), and the hard member 103 is formed through being UV-printed by UV curing. In this case, in this example, the lattice-shaped pattern formed by the hard member 103 is formed in the state in which the lines that form the lattice and have been made by the UV-curable ink are inclined by 45 degrees with respect to the horizontal direction and the vertical direction of the rectangular position detection region.

FIG. 8 is a sectional view taken along line A-A in FIG. 9 and is a sectional view when the pen input device sheet 100 of this embodiment is cut at the diagonal positions of the lattice of the lattice-shaped pattern of the recessed-protruding pattern 1021P.

At this time, parts corresponding to the positions at which the UV-curable ink of the hard member 103 UV-printed on the second layer portion 1022 is not present become the recessed parts 1021Pa of the recessed-protruding pattern 1021P of the first layer portion 1021 of the elastic material layer 102, and parts corresponding to the positions at which the UV-curable ink is present become the protruding parts 1021Pb of the recessed-protruding pattern 1021P of the first layer portion 1021 of the elastic material layer 102.

Then, the sheet-shaped adhesive layer 101 is stuck onto the surface on the opposite side of the side of the second layer portion 1022 in the first layer portion 1021. This forms the pen input device sheet 100 of the embodiment.

Moreover, in the pen input device sheet 100 of this first embodiment, a line width w (see FIG. 9) of the UV-curable ink of the lattice-shaped pattern for forming the recessed-protruding pattern 1021P and a formation pitch Pt (see FIG. 9) of the lattice of the lattice-shaped pattern are selected in order to cause the vibration frequency characteristic of the kinetic friction coefficient of the pen input device sheet 100 to match the vibration frequency characteristic of the kinetic friction coefficient when a pencil is moved on copy paper (see FIGS. 4A, 5A, 6A, and 7A) and cause the maximum value of the peak waveform of the vibration of the kinetic friction coefficient to be exhibited in the frequency range of 17 Hz±5 Hz.

In this embodiment, the lattice-shaped pattern is formed by the UV-curable ink in such a manner that the line width w of the UV-curable ink is set to w=0.11 to 0.15 mm and the formation pitch Pt of the lattice of the lattice-shaped pattern is set to Pt=0.4 to 0.5 mm.

FIGS. 10A to 10C and 11A to 11C illustrate the vibration frequency characteristics of the kinetic friction coefficient of the pen input device sheet 100 of the first embodiment in which a lattice-shaped pattern is formed on the PVC sheet of the second layer portion 1022 with the line width w set to w=0.11 mm and the formation pitch Pt of the lattice set to Pt=0.4 mm and the recessed-protruding pattern 1021P is formed in the first layer portion 1021 of the elastic material layer 102. The vibration frequency characteristics of the kinetic friction coefficient illustrated in FIGS. 10A to 10C and 11A to 11C are ones in the cases in which writing input is made with the electronic pen 1 at a speed of 10 mm/second on the exposed surface of the second layer portion 1022 of the elastic material layer 102, which is the writing input surface of the pen input device sheet 100, while a predetermined writing pressure is applied. Also in these cases, the writing input is made in the state in which the electronic pen 1 is inclined by 45 to 60 degrees with respect to the writing input surface.

Figure 10A:
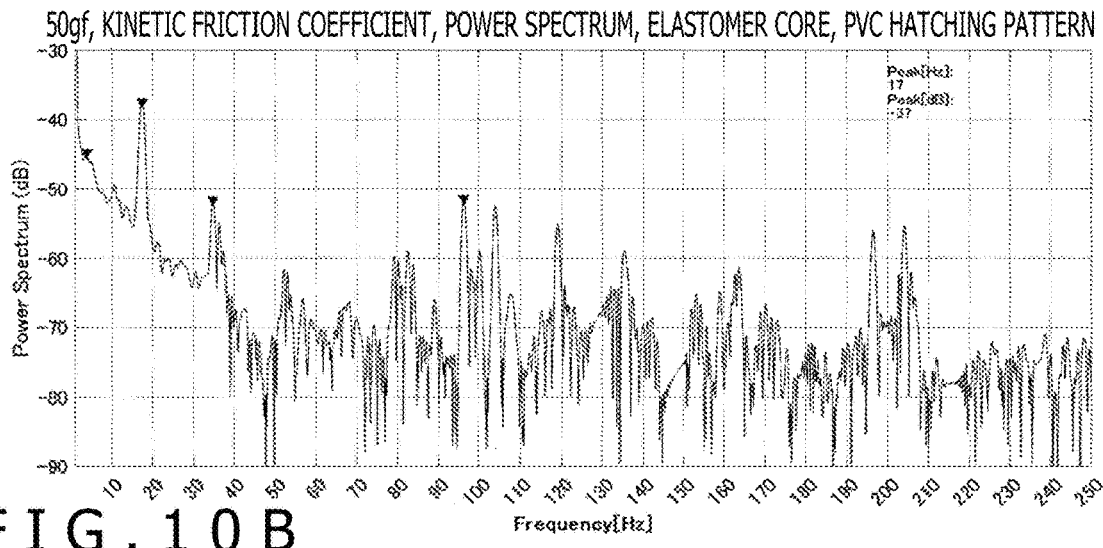
FIGS. 10A to 10C are diagrams illustrating an example of the vibration frequency characteristics of the kinetic friction coefficient in the embodiment of the pen input device sheet according to this disclosure.
Figure 10B:
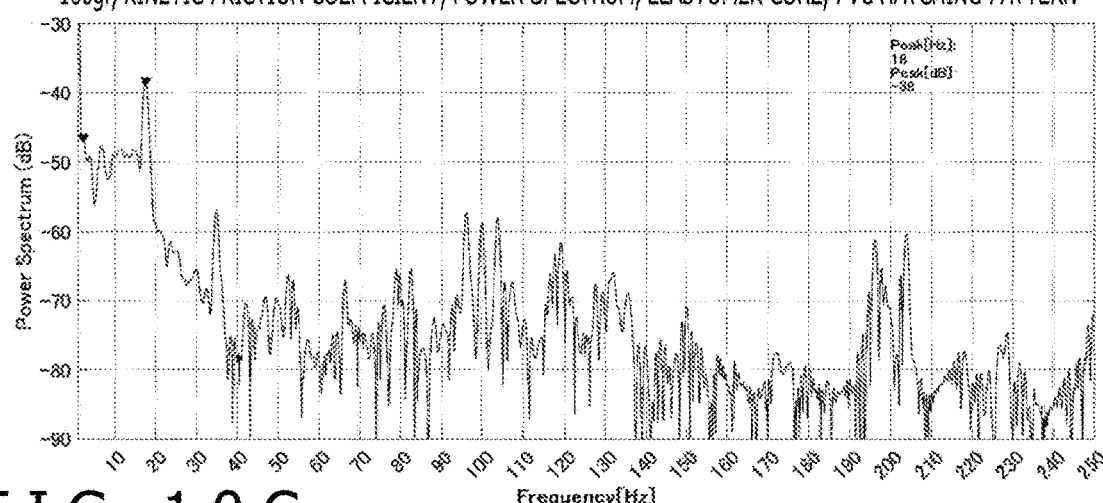
Figure 10C:
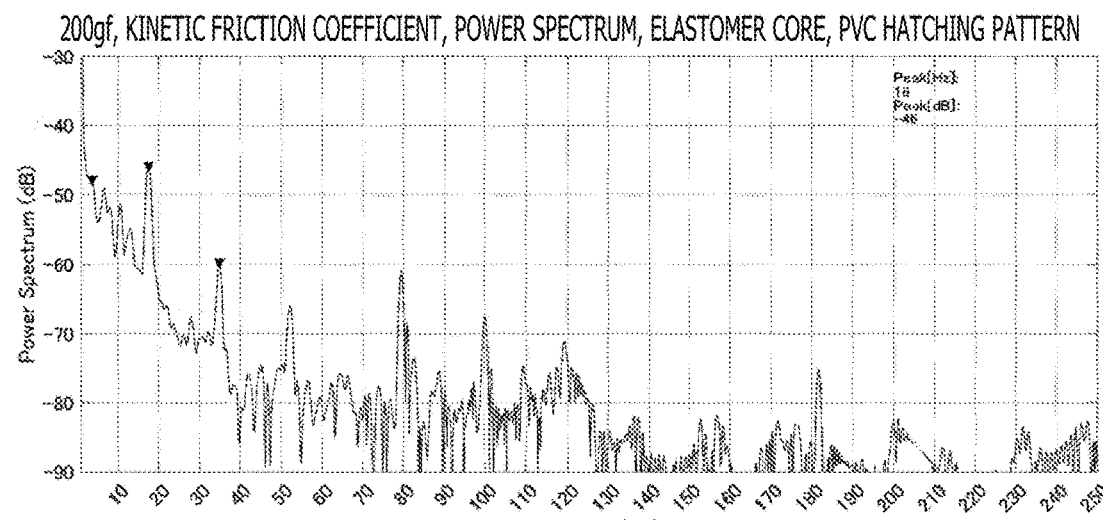

Here, FIGS. 10A to 10C illustrate the vibration frequency characteristics of the kinetic friction coefficient of the pen input device sheet 100 in the cases in which the core body of the electronic pen 1 is composed of polyoxymethylene (POM) that is a hard material. FIG. 10A illustrates the case in which 50 gf is applied as a writing pressure. FIG. 10B illustrates the case in which 100 gf is applied as a writing pressure. FIG. 10C illustrates the case in which 200 gf is applied as a writing pressure.

Figure 11A:
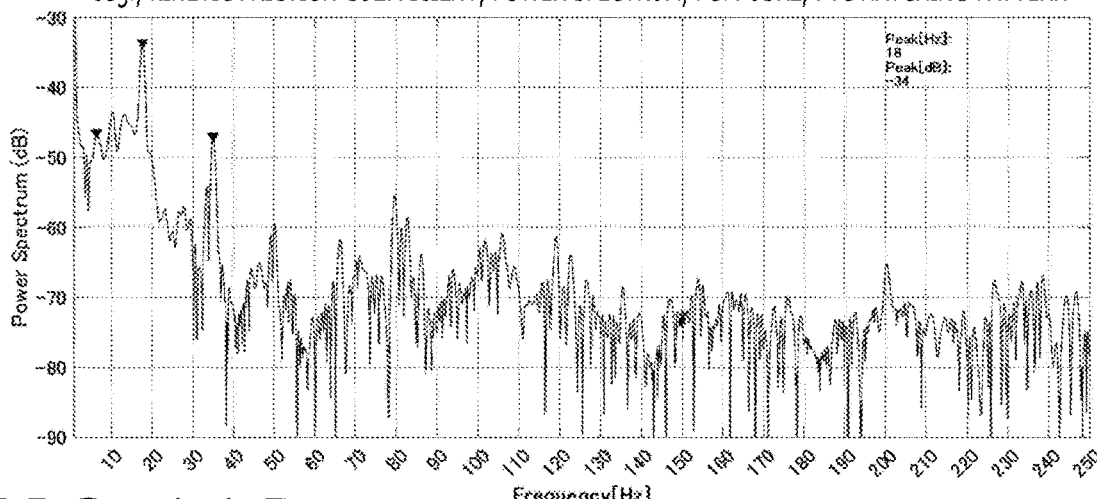
FIGS. 11A to 11C are diagrams illustrating an example of the vibration frequency characteristics of the kinetic friction coefficient in the embodiment of the pen input device sheet according to this disclosure.
Figure 11B:
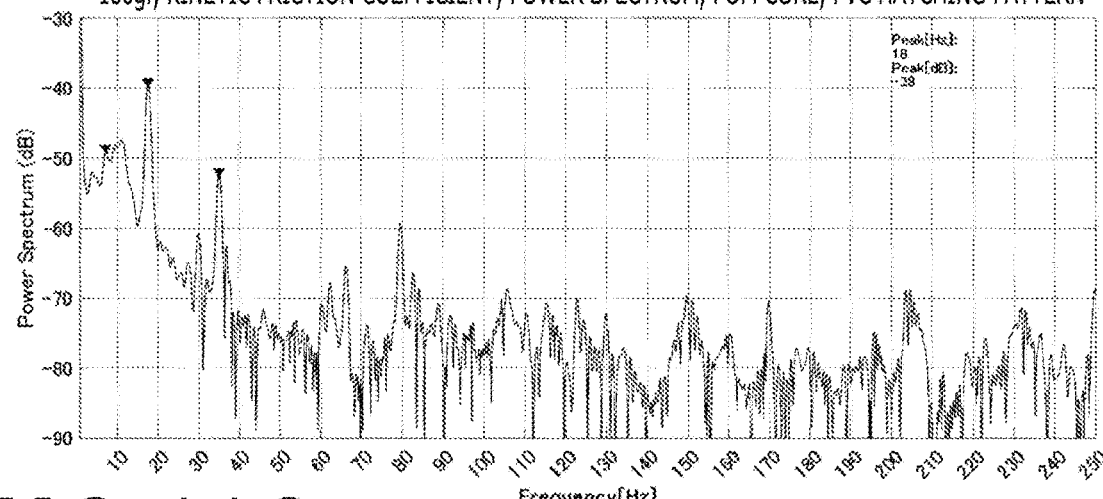
Figure 11C:
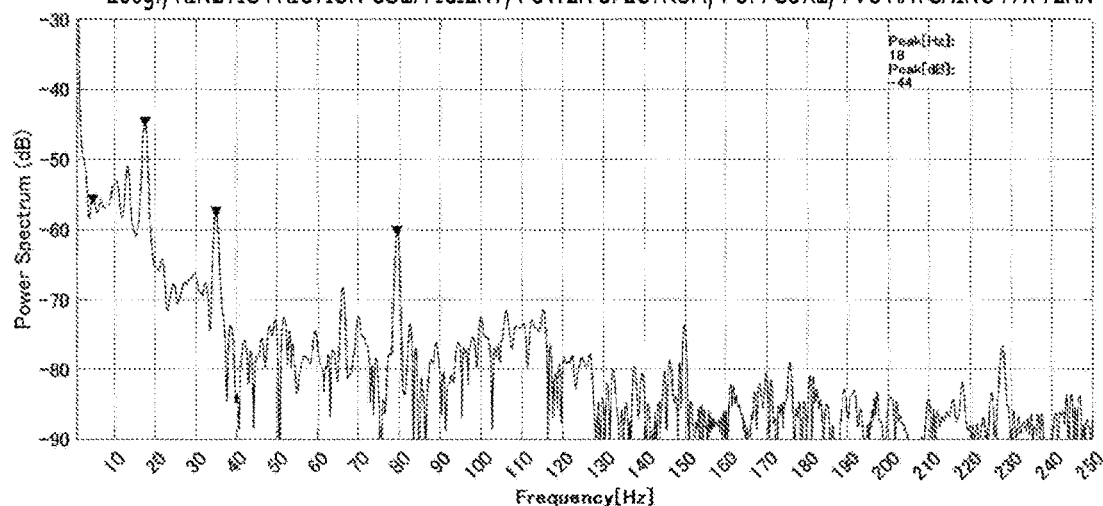

Further, FIGS. 11A to 11C illustrate the vibration frequency characteristics of the kinetic friction coefficient of the pen input device sheet 100 in the cases in which the core body of the electronic pen 1 is composed of an elastomer that is a soft material. FIG. 11A illustrates the case in which 50 gf is applied as a writing pressure. FIG. 11B illustrates the case in which 100 gf is applied as a writing pressure. FIG. 11C illustrates the case in which 200 gf is applied as a writing pressure.

As is understood from FIGS. 10A to 10C and 11A to 11C, it is confirmed that, in the pen input device sheet 100 of this embodiment, the characteristics in which the maximum value of the peak waveform of the vibration of the kinetic friction coefficient is in the range of the frequency of 17 Hz±5 Hz in the vibration frequency characteristic of the kinetic friction coefficient are obtained as in the cases of FIGS. 4A to 7C when writing input is made with the electronic pen 1 at the speed of 10 mm/second on the second layer portion 1022 of the pen input device sheet 100 while the predetermined writing pressure is applied.

Moreover, it has been confirmed that a feeling (writing feel or sense of writing pressure (particularly sense of roughness)) equivalent or close to that when writing is executed on copy paper with a pencil is obtained when writing input is made on the pen input device sheet 100 of this first embodiment.

As described above, according to the pen input device sheet 100 of the above-described first embodiment, when writing input is made with the electronic pen 1 on the pen input device sheet 100, a feeling (writing feel or sense of writing) similar to that when writing input is made with a pencil on copy paper can be obtained. In addition, even a sense of roughness in writing in the relation between the pencil and the paper can be obtained.

In the pen input device sheet 100 of the above-described first embodiment, the configuration is made to have the maximum value of the peak waveform of the vibration of the kinetic friction coefficient in the predetermined frequency range such that the vibration frequency characteristic of the kinetic friction coefficient regarding the pen input device sheet 100 when the electronic pen 1 is moved on the writing input surface at the predetermined speed in the state in which the predetermined writing pressure is applied may match the vibration frequency characteristic of the kinetic friction coefficient when the pencil is moved on the copy paper under the same condition.

However, the configuration may be made to cause the frequency that exhibits the maximum value of the peak waveform of the vibration of the kinetic friction coefficient in the vibration frequency characteristic of the kinetic friction coefficient of the pen input device sheet 100 when the electronic pen 1 is moved at the predetermined speed in the state in which the predetermined writing pressure is applied to, instead of falling within the predetermined frequency range, correspond to, that is, be equal or close to, the frequency that exhibits the maximum value of the peak waveform of the vibration of the kinetic friction coefficient in the vibration frequency characteristic of the kinetic friction coefficient when the pencil is moved on the copy paper under the same condition.

For example, the frequency that exhibits the maximum value of the peak waveform of the vibration of the kinetic friction coefficient in the vibration frequency characteristic of the kinetic friction coefficient when a writing pressure of 50 gf is applied is 17 Hz in the case of the pencil in which the hardness of the core is HB. Thus, in the case of desiring to obtain a writing feel similar to that in the case in which writing is executed on the copy paper with the pencil in which the hardness of the core is HB when writing is executed with the electronic pen 1, the pen input device sheet 100 is configured in such a manner that the frequency that exhibits the maximum value of the peak waveform of the vibration of the kinetic friction coefficient in the vibration frequency characteristic of the kinetic friction coefficient with the writing pressure of 50 gf becomes 17 Hz. That is, the line width w and the formation pitch Pt of the lattice-shaped pattern of the recessed-protruding pattern 1021P of the first layer portion 1021 of the elastic material layer 102 in the above-described embodiment are selected to make such a configuration.

Further, when the value of the writing pressure applied to the pencil and the hardness of the core of the pencil are changed as the target having the writing feel desired to be obtained when writing is executed with the electronic pen 1, the pen input device sheet 100 is configured to exhibit the maximum value of the peak waveform of the vibration of the kinetic friction coefficient at a frequency corresponding to the frequency that exhibits the maximum value of the peak waveform of the vibration of the kinetic friction coefficient in the vibration frequency characteristic of the kinetic friction coefficient with the value of the writing pressure and the hardness of the core of the pencil.

Configuration Example of Pen Input Device Sheet of Second Embodiment

A pen input device sheet of a second embodiment corresponds to the case in which a combination of a writing material and a writing medium of a target having the writing feel desired to be obtained with the electronic pen is a combination of a ballpoint pen and paper.

Vibration Frequency Characteristic of Kinetic Friction Coefficient in Combination of Writing Material and Writing Medium of Target In this example, "Uni 0.5 mm Lakubo" made by MITSUBISHI PENCIL COMPANY, LIMITED was used as the ballpoint pen as an example of the writing material, and "Campus Loose Leaf Notebook NO-837WEN" made by KOKUYO Co., Ltd. was used as the paper as an example of the writing medium.

Then, the above-described ballpoint pen was moved on overlapped two pieces of paper and overlapped three pieces of paper, and the kinetic friction coefficient on that occasion was measured. In this case, in the state in which three kinds of pressures, 50 gf, 100 gf, and 200 gf, were applied to the ballpoint pen as the writing pressure, the ballpoint pen was caused to make, for example, a linear movement on the paper at a speed of 10 mm/second, and the measurement was executed. The ballpoint pen was moved in the state in which the ballpoint pen was inclined at an angle of approximately 45 to 60 degrees with respect to the plane of the paper. Next, a Fourier transform of the time-series change of the kinetic friction coefficient obtained as the measurement result was performed to obtain the power spectrum of change (vibration) with respect to the time elapse of the kinetic friction coefficient, that is, the vibration frequency characteristic of the kinetic friction coefficient.

The obtained vibration frequency characteristics of the kinetic friction coefficient are illustrated in FIGS. 12A to 12C and 13A to 13C. FIGS. 12A to 12C and 13A to 13C illustrate the vibration frequency characteristics of the kinetic friction coefficient in the cases in which the number of pieces of paper was two and three, respectively.

Moreover, FIGS. 12A and 13A, FIGS. 12B and 13B, and FIGS. 12C and 13C illustrate the vibration frequency characteristics of the kinetic friction coefficient in the cases in which 50 gf, 100 gf, and 200 gf, respectively, was applied to the ballpoint pen as the writing pressure.

Figure 12A:
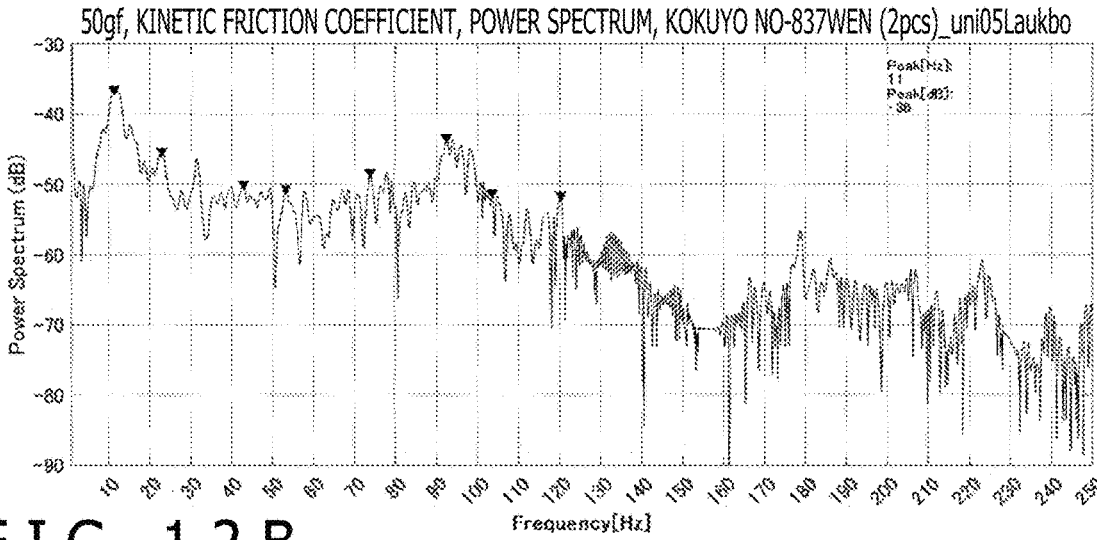
FIGS. 12A to 12C are diagrams illustrating an example of the vibration frequency characteristics of the kinetic friction coefficient in another example of the writing material and the writing medium employed as the target for an embodiment of the pen input device sheet according to this disclosure.
Figure 12B:
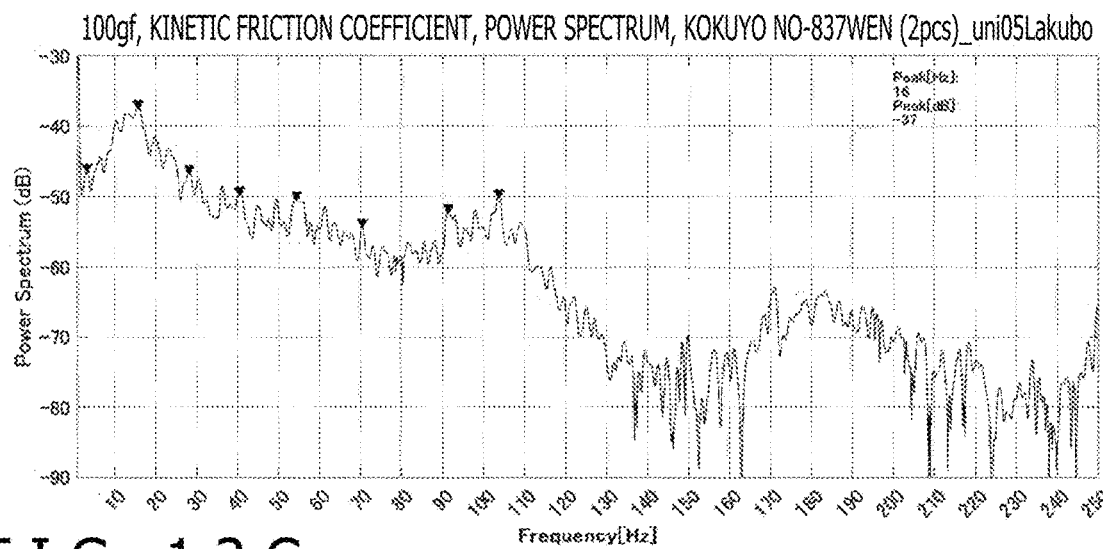
Figure 12C:
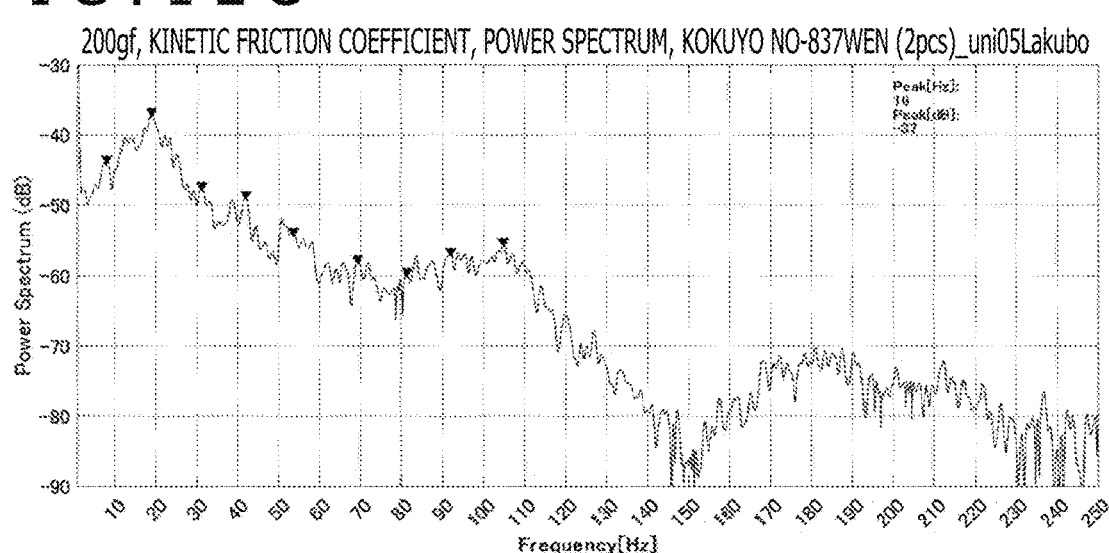
Figure 13A:
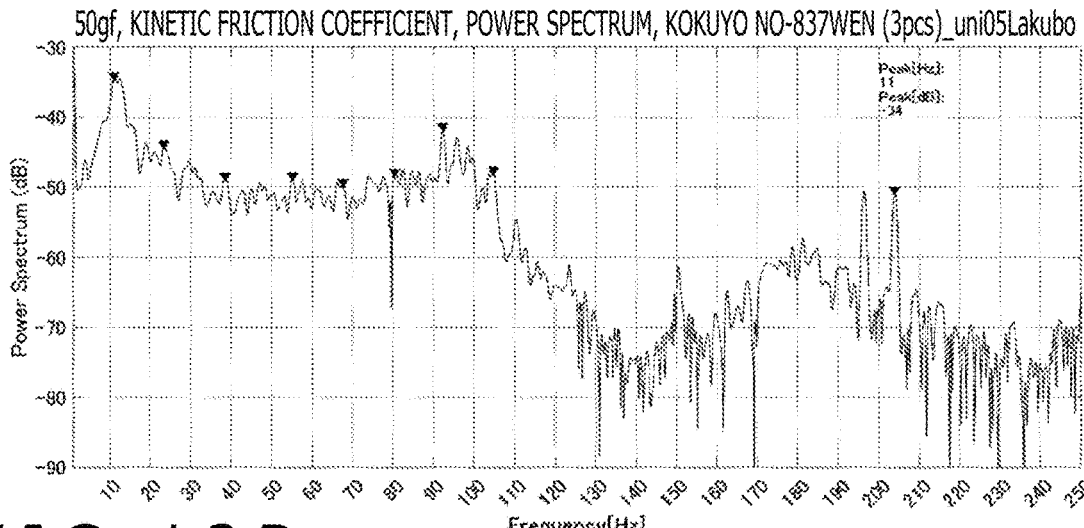
FIGS. 13A to 13C are diagrams illustrating an example of the vibration frequency characteristics of the kinetic friction coefficient in the other example of the writing material and the writing medium employed as the target for the embodiment of the pen input device sheet according to this disclosure.
Figure 13B:
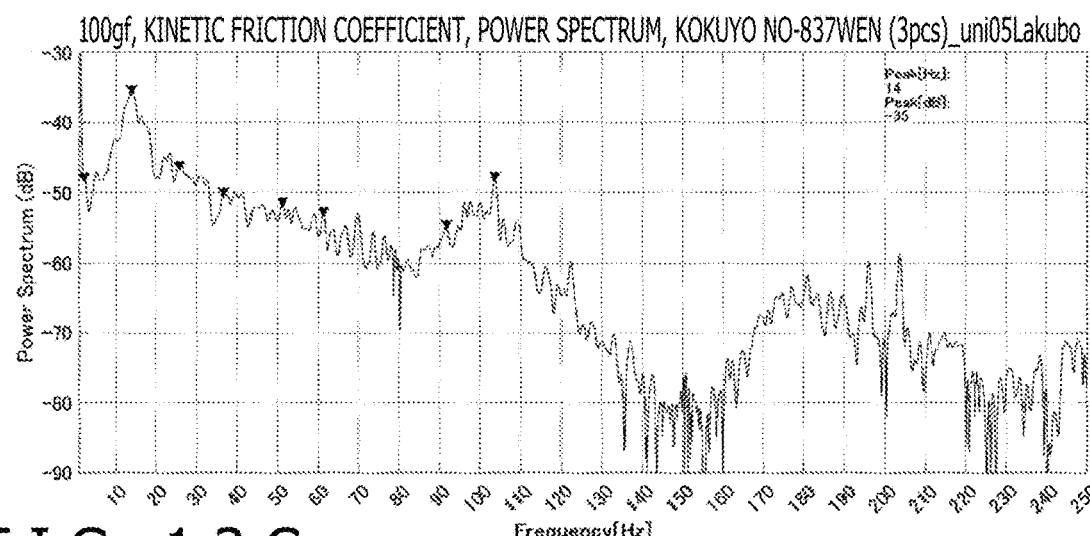
Figure 13C:
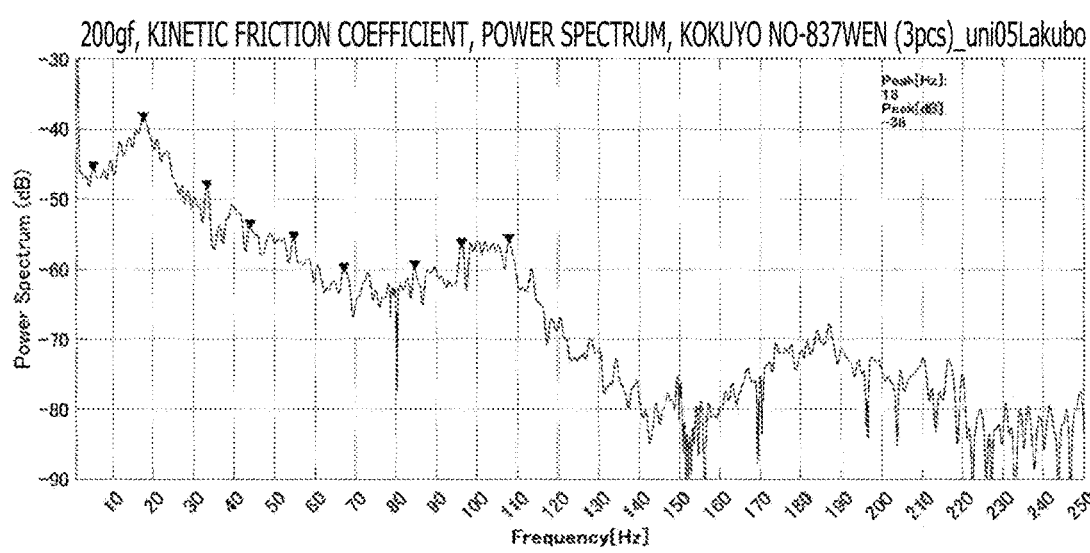
Figure 15A:
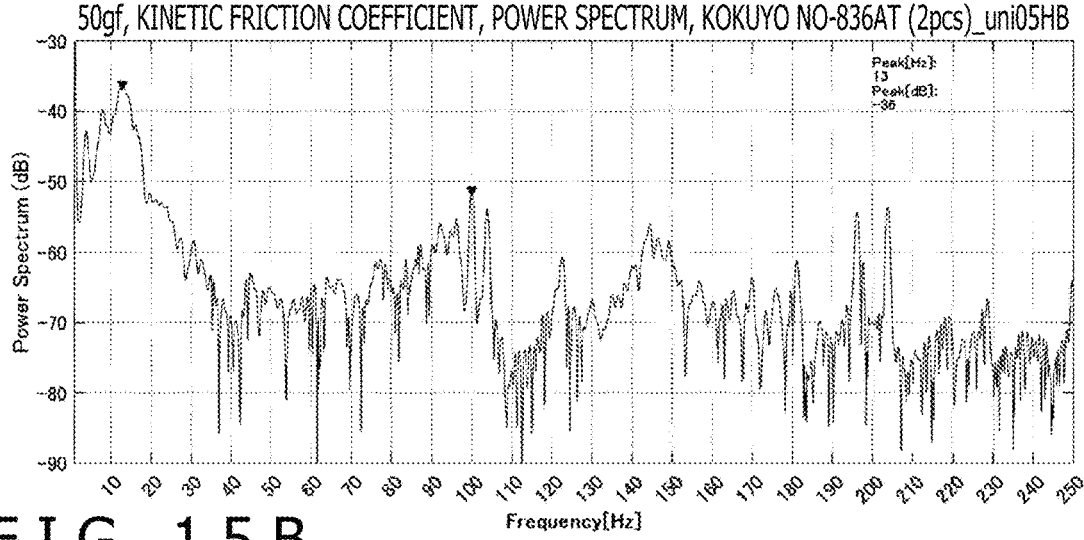
FIGS. 15A to 15C are diagrams illustrating an example of the vibration frequency characteristics of the kinetic friction coefficient in the one example of the writing material and the writing medium employed as the target for the embodiment of the pen input device sheet according to this disclosure.
Figure 15B:
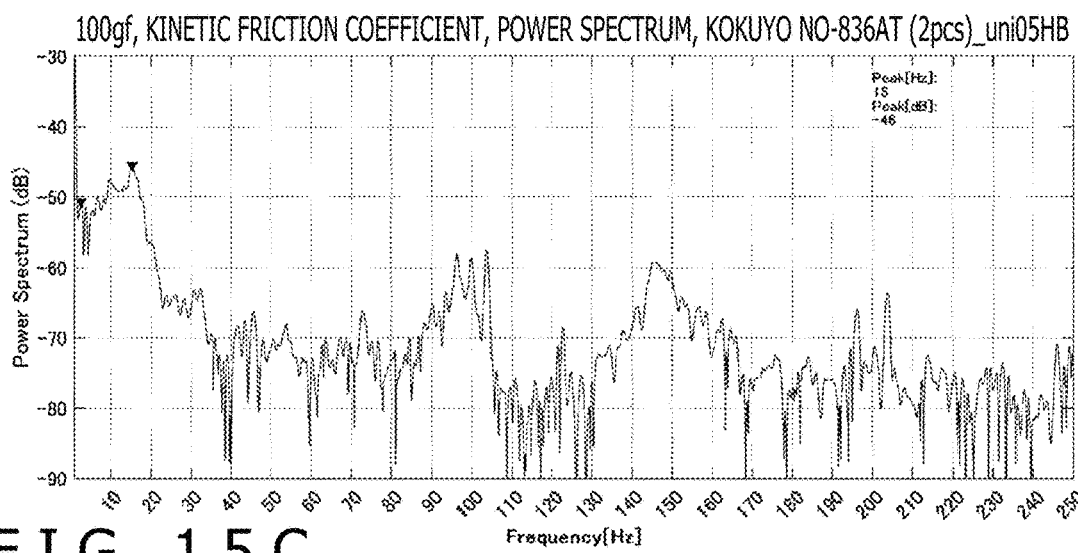
Figure 15C:
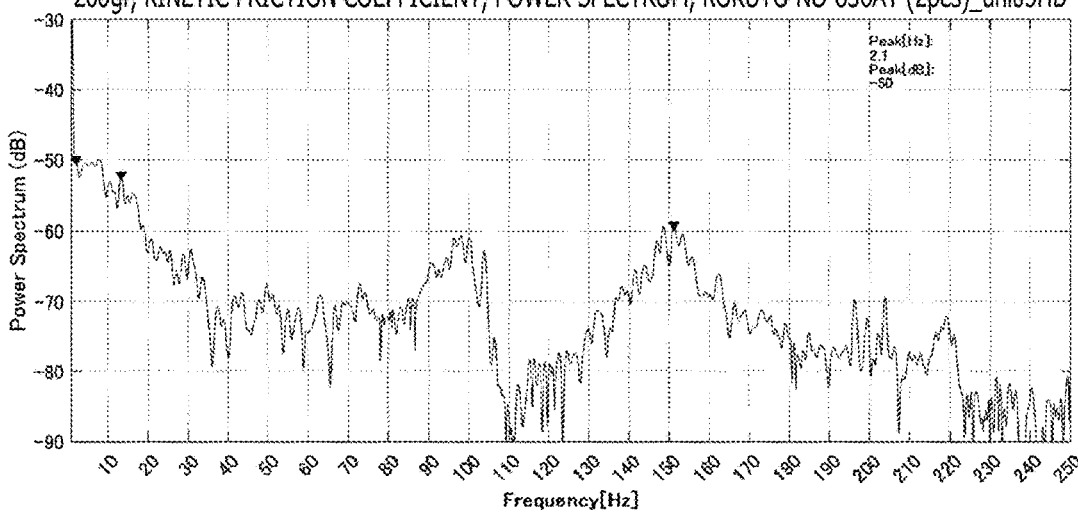
Figure 16A:
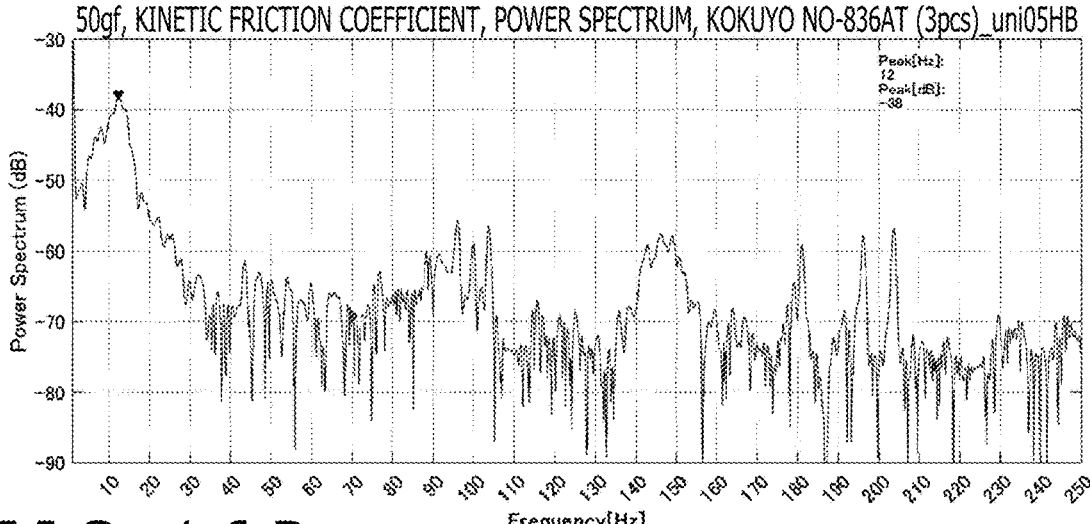
FIGS. 16A to 16C are diagrams illustrating an example of the vibration frequency characteristics of the kinetic friction coefficient in the one example of the writing material and the writing medium employed as the target for the embodiment of the pen input device sheet according to this disclosure.
Figure 16B:
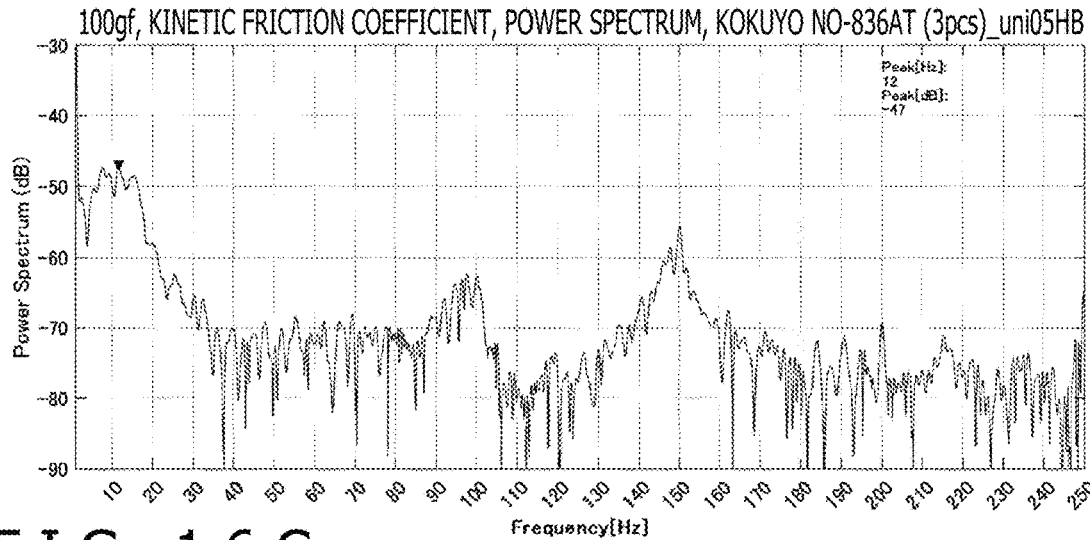
Figure 16C:
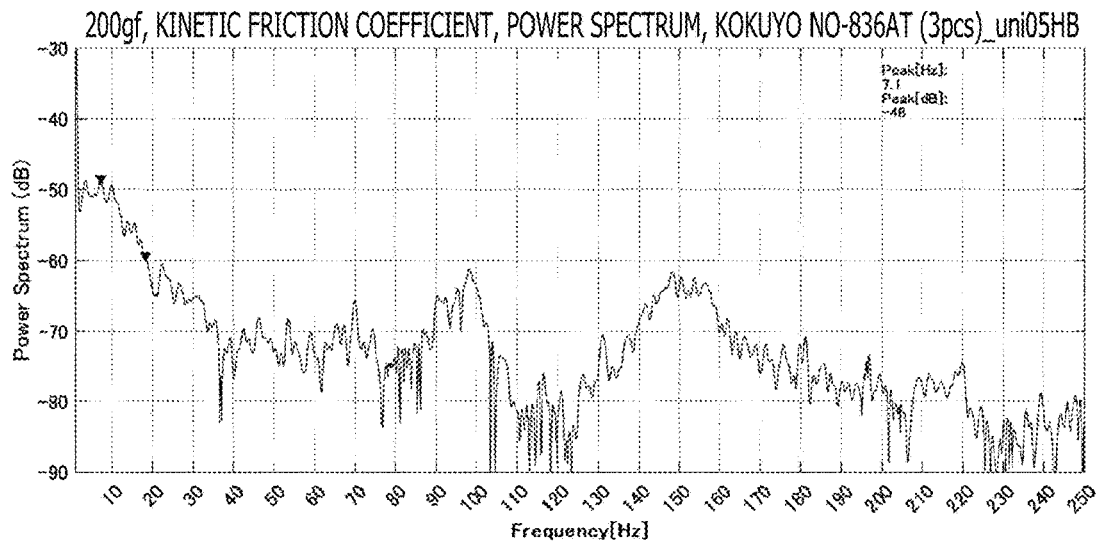
Figure 17A:
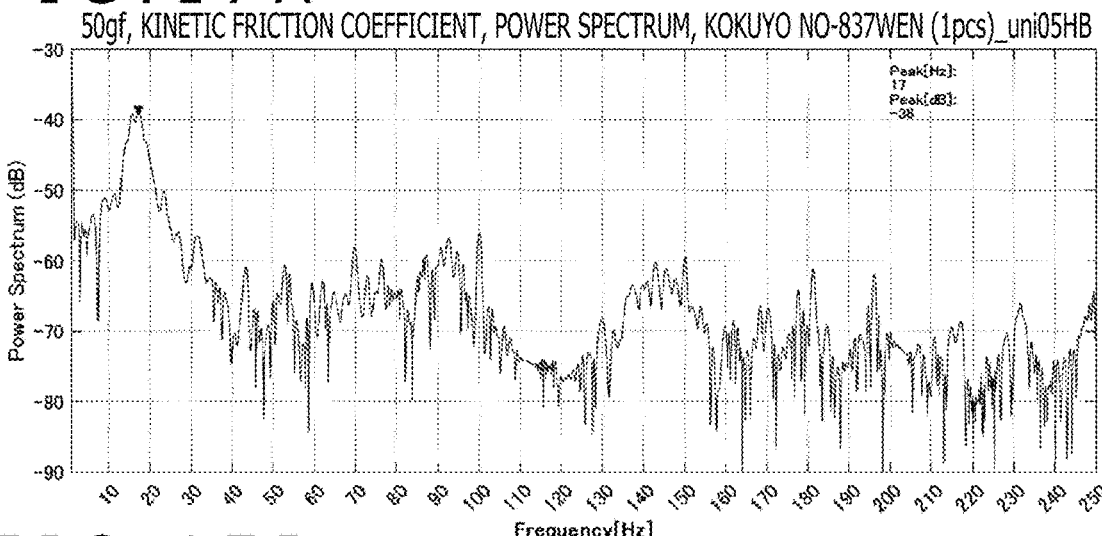
FIGS. 17A to 17C are diagrams illustrating an example of the vibration frequency characteristics of the kinetic friction coefficient in one example of the writing material and the writing medium employed as the target for the embodiment of the pen input device sheet according to this disclosure.
Figure 17B:
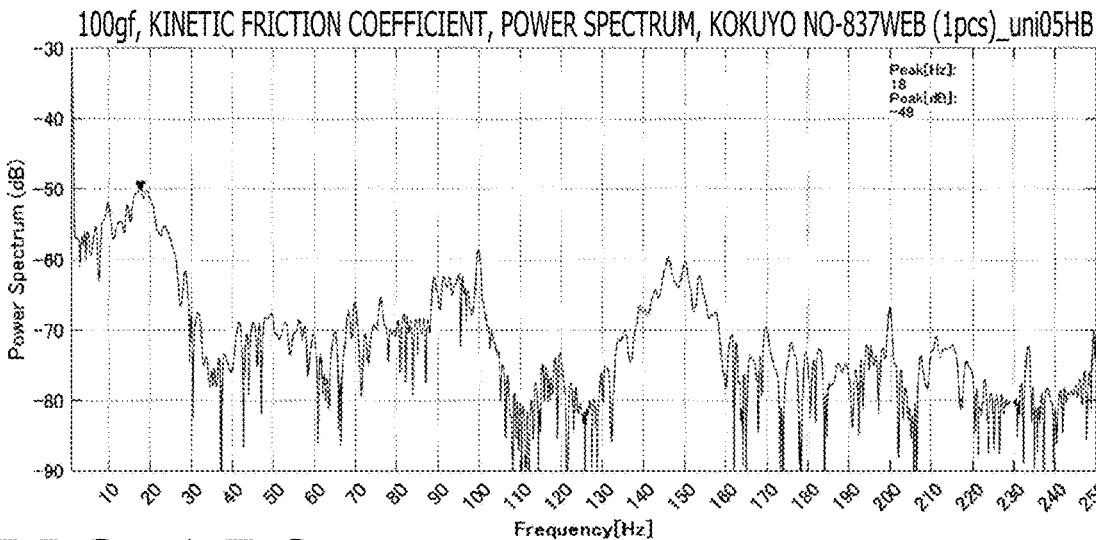
Figure 17C:
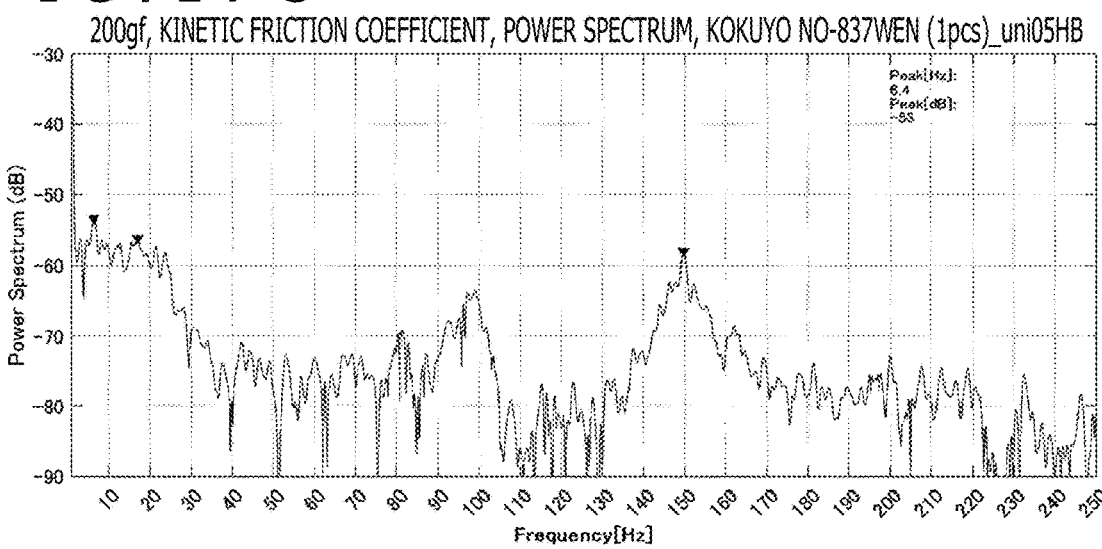
Figure 19A:
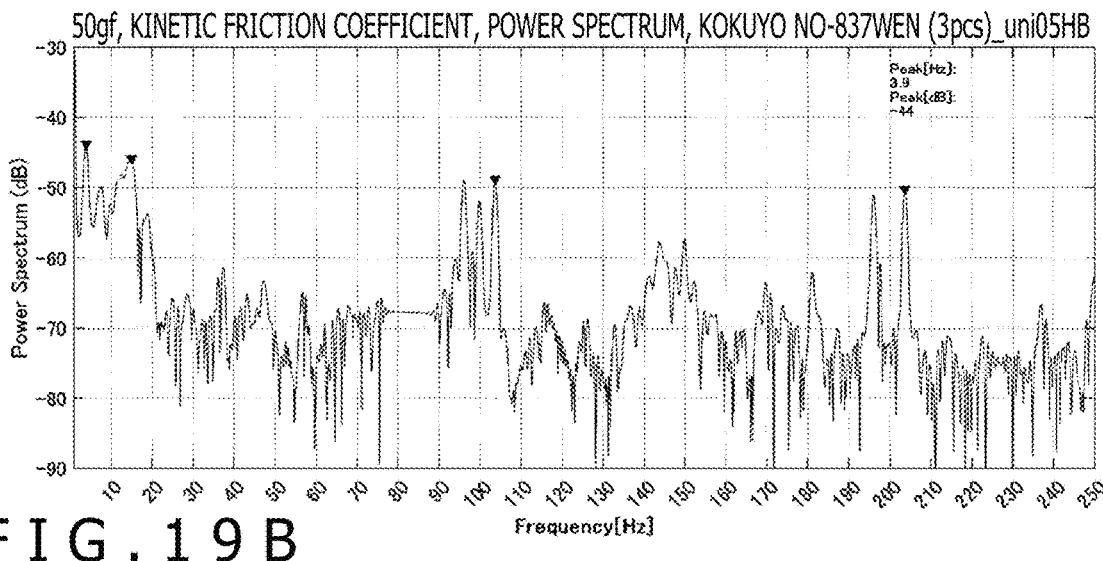
FIGS. 19A to 19C are diagrams illustrating an example of the vibration frequency characteristics of the kinetic friction coefficient in the one example of the writing material and the writing medium employed as the target for the embodiment of the pen input device sheet according to this disclosure.
Figure 19B:
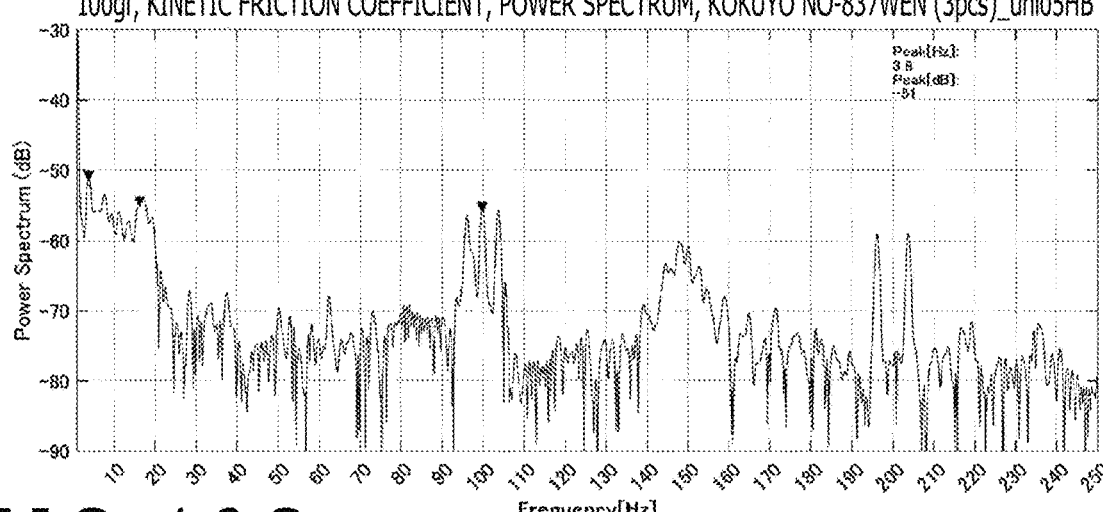
Figure 19C:
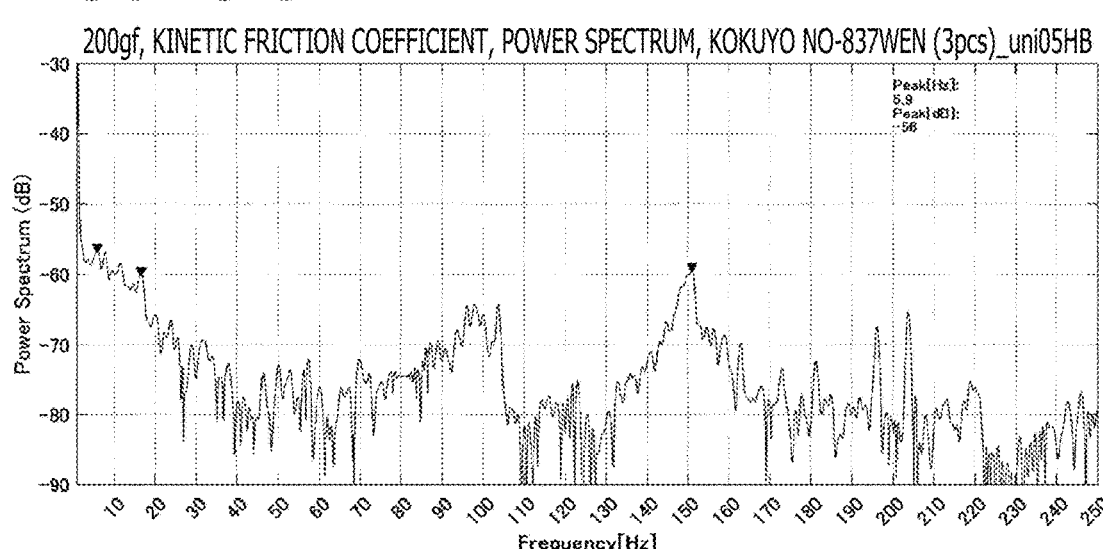

When reference to FIGS. 12A and 13A is made, it can be confirmed that the vibration frequency characteristics of the kinetic friction coefficient in the cases in which writing is executed on the paper with the ballpoint pen to which 50 gf is applied as the writing pressure are characteristics in which the maximum value of the peak waveform of the vibration of the kinetic friction coefficient is exhibited at a frequency of 11 Hz. In general, the writing pressure when a user holds a ballpoint pen and executes writing on a writing medium is approximately 50 gf.

Furthermore, when reference to FIGS. 12B and 12C and FIGS. 13B and 13C is made, it can be confirmed that the frequency that exhibits the maximum value of the peak waveform of the vibration of the kinetic friction coefficient in the vibration frequency characteristic of the kinetic friction coefficient shifts in the higher frequency direction as the writing pressure applied to the ballpoint pen becomes higher and the maximum value of the peak waveform of the vibration of the kinetic friction coefficient varies very little although being slightly suppressed. Moreover, it has been confirmed that the frequency that exhibits the maximum value of the peak waveform of the vibration of the kinetic friction coefficient in the vibration frequency characteristic of the kinetic friction coefficient when writing is executed on the paper with the ballpoint pen to which a writing pressure of 50 gf is applied varies very little also when the number of pieces of paper is different and, when the writing pressure becomes higher, the frequency that exhibits the maximum value shifts to the slightly-higher frequency side when the number of pieces of paper is larger.

The pen input device sheet of this second embodiment is configured in light of the above measurement result. In this second embodiment, a configuration in which the elastic material layer 102 is formed on the adhesive layer 101 is employed, as in the pen input device sheet 100. However, in this second embodiment, the hard member 103 formed in the first layer portion 1021 by UV printing is made to have a configuration based on the vibration frequency characteristics of the kinetic friction coefficient indicated in the above-described FIGS. 12A to 12C and 13A to 13C.

That is, the hard member 103 is formed by UV printing on a PVC sheet with a film thickness of 0.1 mm as the second layer portion 1022. The line width of UV-curable ink and the formation pitch of the lattice-shaped pattern in the formation are set to values settled by the vibration frequency characteristics of the kinetic friction coefficient indicated in the above-described FIGS. 12A to 12C and 13A to 13C.

In this case, in the case of desiring to obtain the writing feel that is available when writing is executed on the paper with the ballpoint pen even when a change from 50 to 200 gf occurs as the value of the writing pressure, the pen input device sheet of the second embodiment is configured in such a manner that the frequency that exhibits the maximum value of the peak waveform of the vibration of the kinetic friction coefficient in the vibration frequency characteristic of the kinetic friction coefficient when writing is executed with the electronic pen 1 on the pen input device sheet of the second embodiment is in a frequency range of 11 to 19 Hz. That is, for formation of the hard member 103 formed by UV printing in the first layer portion 1021, the line width of the UV-curable ink and the formation pitch of the lattice-shaped pattern are selected as values with which such a frequency characteristic is obtained.

Further, in the case of desiring to obtain the writing feel that is available when writing is executed on the paper with the ballpoint pen even when a change from 50 to 100 gf occurs as the value of the writing pressure, the pen input device sheet of the second embodiment is configured in such a manner that the frequency that exhibits the maximum value of the peak waveform of the vibration of the kinetic friction coefficient in the vibration frequency characteristic of the kinetic friction coefficient when writing is executed with the electronic pen 1 on the pen input device sheet of the second embodiment is in a frequency range of 11 to 16 Hz. That is, the hard member 103 is formed by UV printing in the first layer portion 1021, and the line width of the UV-curable ink and the formation pitch of the lattice-shaped pattern in the formation are selected as values with which such a frequency characteristic is obtained.

Moreover, in the case of desiring to obtain the writing feel when writing is executed on the paper with the ballpoint pen to which 50 gf is applied as the value of the writing pressure, the pen input device sheet of the second embodiment is configured in such a manner that 11 Hz is obtained as the frequency that exhibits the maximum value of the peak waveform of the vibration of the kinetic friction coefficient in the vibration frequency characteristic of the kinetic friction coefficient when writing is executed with the electronic pen 1 on the pen input device sheet of the second embodiment. That is, for formation of the hard member 103 formed by UV printing in the first layer portion 1021, the line width of the UV-curable ink and the formation pitch of the lattice-shaped pattern are selected as values with which such a frequency characteristic is obtained.

Furthermore, when reference to FIGS. 12B and 12C and FIGS. 13B and 13C is made, it is confirmed that the frequency that exhibits the maximum value of the peak waveform of the vibration of the kinetic friction coefficient in the vibration frequency characteristic of the kinetic friction coefficient tends to vary to a lower frequency when the number of pieces of paper is larger as the writing pressure becomes higher to reach 100 gf and 200 gf but does not vary even when the number of pieces of paper changes in the case in which the writing pressure is 50 gf. It is safe to consider that the number of pieces of paper corresponds to the thickness of one piece of paper.

Accordingly, when the thickness of paper as a writing medium is taken into consideration as the target having the writing feel desired to be obtained when writing is executed with the electronic pen 1, it is effective that the frequency or the frequency range that exhibits the maximum value of the peak waveform of the vibration of the kinetic friction coefficient in the vibration frequency characteristic of the kinetic friction coefficient when writing is executed with the electronic pen 1 on the pen input device sheet of the embodiment is made different according to the thickness of the paper.

Also in the case of the above-described combination of the pencil and the paper, the vibration frequency characteristic of the kinetic friction coefficient with variation in the thickness of the paper has the tendency that the frequency that exhibits the maximum value of the peak waveform varies to a lower frequency when the thickness of the paper is larger, as in the case of the ballpoint pen. That is, irrespective of the difference in the writing material, the frequency that indicates the maximum value of the peak waveform of the vibration of the kinetic friction coefficient in the vibration frequency characteristic of the kinetic friction coefficient of the pen input device sheet tends to vary to a lower frequency when the thickness of the paper is larger.

As a material that supports this, an example of the vibration frequency characteristics of the kinetic friction coefficient when the thickness of paper was varied in a combination of a pencil and the paper is illustrated in FIGS. 14A to 19C. FIGS. 14A to 16C indicate the vibration frequency characteristics of the kinetic friction coefficient when writing was executed with a 0.5 mm, Hi-Uni, HB mechanical pencil lead made by MITSUBISHI PENCIL COMPANY, LIMITED with use of "Campus Loose Leaf Notebook NO-836AT" made by KOKUYO Co., Ltd. as the paper. FIGS. 14A to 14C, 15A to 15C, and 16A to 16C illustrate the cases in which the number of pieces of paper was one, two, and three, respectively. Moreover, FIGS. 17A to 19C are the cases in which a 0.5 mm, Hi-Uni, HB mechanical pencil lead made by MITSUBISHI PENCIL COMPANY, LIMITED was used as an example of the pencil as in the cases of FIGS. 14A to 16C whereas the paper was changed to "Campus Loose Leaf Notebook NO-837WEN" made by KOKUYO Co., Ltd. FIGS. 17A to 17C, 18A to 18C, and 19A to 19C illustrate the cases in which the number of pieces of paper was one, two, and three, respectively.

According to the pen input device sheet of the above-described second embodiment, when writing input is made with the electronic pen on the pen input device sheet, a feeling (writing feel or sense of writing) similar to that when writing input is made with a ballpoint pen on paper can be obtained.

Other Examples of Specific Configuration Example (Structure Example) of Pen Input Device Sheet Next, other examples of the specific configuration example (structure example) of the pen input device sheet will be described as modification examples of the configuration example of the pen input device sheet 100 of the above-described first embodiment.

First Modification Example

FIG. 20 is a diagram for explaining a specific configuration example (structure example) of a pen input device sheet 100A of a first modification example. In the pen input device sheet 100A of the example of FIG. 20, the same constituent part as that of the pen input device sheet 100 of the above-described first embodiment is given the same reference numeral, and detailed description thereof is omitted.

The pen input device sheet 100A of this first modification example is made to have a configuration obtained by removing the adhesive layer 101 from the pen input device sheet 100 of the first embodiment.

That is, in the pen input device sheet 100A of this first modification example, an elastic material layer 102A is made to have a configuration having the first layer portion 1021 on the side facing the position detecting device 300 and the second layer portion 1022 on the opposite side of the side of the position detecting device 300.

In this case, the tips of the protruding parts 1021Pb of the recessed-protruding pattern 1021P of the first layer portion 1021 on the side of the position detecting device 300 are exposed from a surface of the elastic material layer 102A.

In the pen input device sheet 100A of this first modification example, the pen input device sheet 100A is formed with the elastic material layer 102A alone as illustrated in FIG. 20.

Even with the above configuration, when writing input is made with the electronic pen on the pen input device sheet 100A of this first modification example, a feeling (writing feel or sense of writing) similar to that of the pen input device sheet 100 of the above-described first embodiment can be obtained by holding down the pen input device sheet 100A by a hand or tape to keep the pen input device sheet 100A from moving similarly to paper.

Second Modification Example

FIG. 21 is a diagram for explaining a specific configuration example (structure example) of a pen input device sheet 100B of this second modification example. In the pen input device sheet 100B of the example of FIG. 21, the same constituent part as that of the pen input device sheet 100 of the above-described first embodiment is given the same reference numeral and detailed description thereof is omitted.

The pen input device sheet 100B of this second modification example is an example in which the adhesive layer 101 of the pen input device sheet 100 of the first embodiment is changed to a base 105.

As illustrated in FIG. 21, the pen input device sheet 100B of this second modification example is composed of the base 105 and the elastic material layer 102 disposed on this base 105.

The base 105 is composed of a material harder than the elastic material of the elastic material layer 102, in this example, polyethylene terephthalate (PET) resin. Further, in this example, the base 105 is made into a sheet-shaped member that is disposed on the position detecting device 300 and covers the whole of the position detection region of the position detecting sensor 310 of the position detecting device 300.

Also in this second modification example, the elastic material layer 102 is composed of the first layer portion 1021 and the second layer portion 1022 as layer portions of a plurality of layers made into configurations (structures) different in the thickness direction thereof, as in the first embodiment. In this example, the elastic material layer 102 is configured to have the first layer portion 1021 on the side of the base 105 and have the second layer portion 1022 on the opposite side of the side of the base 105.

In this case, the tips of the protruding parts 1021Pb forming the recessed-protruding pattern 1021P of the first layer portion 1021 on the side of the base 105 are made to abut against one surface of the base 105.

Even with the above configuration, when writing input is made with the electronic pen on the pen input device sheet 100B of this second modification example, a feeling (writing feel or sense of writing) similar to that of the pen input device sheet 100 of the above-described first embodiment can be obtained by holding down the pen input device sheet 100B by a hand or tape to keep the pen input device sheet from moving similarly to paper.

Third Modification Example

FIG. 22 is a diagram for explaining a specific configuration example (structure example) of a pen input device sheet 100C of this third modification example. In the pen input device sheet 100C of the example of FIG. 22, the same constituent part as that of the pen input device sheet 100 of the above-described first embodiment is given the same reference numeral, and detailed description thereof is omitted.

The pen input device sheet 100C of this third modification example is an example in which the adhesive layer 101 is added to the surface on the opposite side of the side of the elastic material layer 102 in the base 105 of the pen input device sheet 100B of the second modification example.

As illustrated in FIG. 22, the pen input device sheet 100C of this third modification example is composed of the adhesive layer 101, the base 105 disposed on this adhesive layer 101, and the clastic material layer 102 disposed on this base 105. Moreover, this pen input device sheet 100C is disposed to be stuck onto the upper surface of a top plate 500 of a pen tablet terminal casing.

Even with the above configuration, when writing input is made with the electronic pen on the pen input device sheet 100C of this third modification example, a feeling (writing feel or sense of writing) similar to that of the pen input device sheet 100 of the above-described first embodiment can be obtained.

Fourth Modification Example

Figure 23:
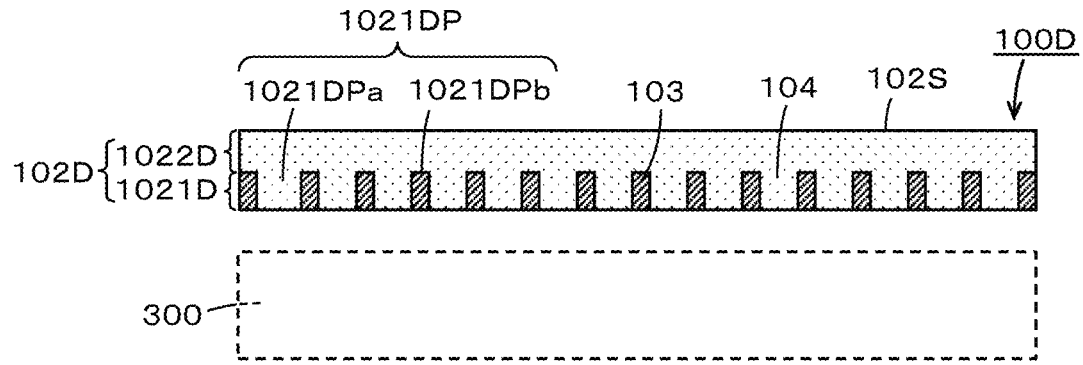
FIG. 23 is a sectional view for explaining a fourth modification example of the configuration example of the embodiment of the pen input device sheet according to this disclosure.

FIG. 23 is a diagram for explaining a specific configuration example (structure example) of a pen input device sheet 100D of this fourth modification example. In the pen input device sheet 100D of the example of FIG. 23, the same constituent part as that of the pen input device sheet 100 of the above-described first embodiment is given the same reference numeral, and detailed description thereof is omitted.

The pen input device sheet 100D of this fourth modification example is equivalent to an example obtained by, in the pen input device sheet 100 of the first embodiment, changing the elastic material to polyurethane resin, filling the recessed parts of the recessed-protruding pattern of the first layer portion 1021 with the elastic material, and removing the adhesive layer 101.

As in the first embodiment, also in the pen input device sheet 100D of this fourth modification example, an elastic material layer 102D is composed of a first layer portion 1021D and a second layer portion 1022D as layer portions of a plurality of layers made to have configurations (structures) different in the thickness direction thereof. Further, in this fourth modification example, the elastic material layer 102D is made to have a configuration having the first layer portion 1021D on the side facing the position detecting device 300 and the second layer portion 1022D on the opposite side of the side of the position detecting device 300.

In the pen input device sheet 100D of this fourth modification example, the pen input device sheet 100D is formed with the elastic material layer 102D alone as illustrated in FIG. 23. Here, as an example of the configurations (structures) different between the first layer portion 1021D and the second layer portion 1022D, they are made different from each other in the density per unit volume and/or are made different from each other in the hardness per unit volume.

In the pen input device sheet 100D of the fourth modification example in FIG. 23, the second layer portion 1022D of the elastic material layer 102D is composed of only the single polyurethane resin. Moreover, the first layer portion 1021D is made to have a configuration having a recessed-protruding pattern 1021DP in which recessed parts 1021DPa and protruding parts 1021DPb are alternately repeated along the direction of a plane parallel to the exposed surface 102S of the second layer portion 1022D. In this example, a lattice-shaped pattern as the one illustrated in FIG. 9 is employed as this recessed-protruding pattern 1021DP. Thus, in this example, the first layer portion 1021D and the second layer portion 1022D are made to have configurations different in both the density and the hardness per unit volume.

In this case, the recessed parts 1021DPa of the recessed-protruding pattern 1021DP of the first layer portion 1021D on the side of the position detecting device 300 are filled with the same clastic material as the second layer portion 1022D. An optical material is used as this elastic material in the case of a terminal having the display device 202.

In this fourth modification example, the tips of the protruding parts 1021DPb are exposed from a surface of the elastic material layer 102D. Moreover, this example employs a configuration in which the protruding parts 1021DPb of the recessed-protruding pattern 1021DP of the first layer portion 1021D on the side of the position detecting device 300 are filled with the hard member 103 composed of a material sufficiently harder than the second layer portion 1022D and the recessed parts 1021DPa of the recessed-protruding pattern 1021DP of the first layer portion 1021D. In this example, this hard member 103 is composed of a UV-curable material. Although the hard member 103 is illustrated by a thick black line in order to illustrate the hard member 103 more clearly in FIG. 9, an optical material is used also for this hard member 103 in the case of a terminal having the display device 202. There is no air layer in the pen input device sheet 100D. Thus, by selecting the optical member as the constituent member, a large change in the refractive index across the boundary between members inside this pen input device sheet can be prevented, and use as a pen input device sheet having optical characteristics is enabled.

Even with the above configuration, when writing input is made with the electronic pen on the pen input device sheet 100C of this fourth modification example, a feeling (writing feel or sense of writing) similar to that of the pen input device sheet 100 can be obtained by holding down the pen input device sheet 100D by a hand or tape to keep the pen input device sheet from moving similarly to paper.

Fifth Modification Example

Figure 24:
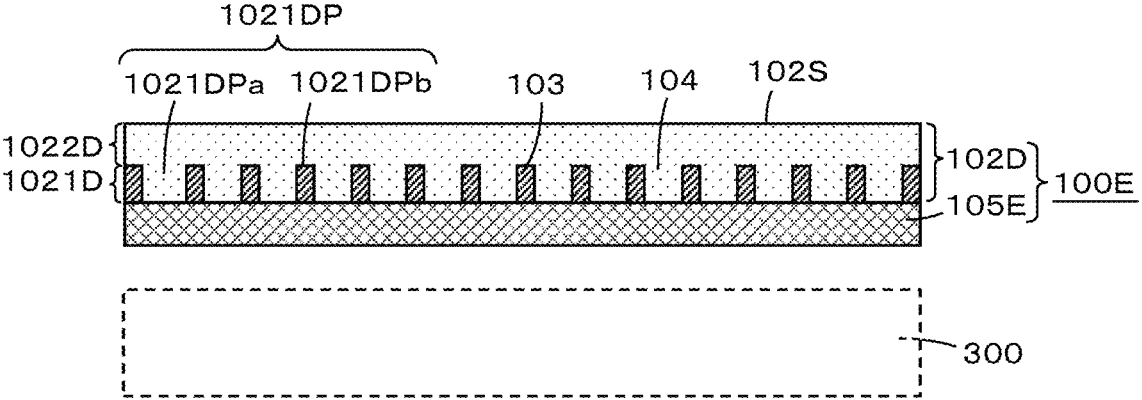
FIG. 24 is a sectional view for explaining a fifth modification example of the configuration example of the embodiment of the pen input device sheet according to this disclosure.

FIG. 24 is a diagram for explaining a specific configuration example (structure example) of a pen input device sheet 100E of a fifth modification example. In the pen input device sheet 100E of the example of FIG. 24, the same constituent part as the pen input device sheet 100D of the above-described fourth modification example in FIG. 23 is given the same reference numeral, and detailed description thereof is omitted.

The pen input device sheet 100E of this fifth modification example is a modification example in which a base 105E is disposed on the surface on the side of the position detecting device 300 in the elastic material layer 102D forming the pen input device sheet 100D of the fourth modification example.

The base 105E is composed of a material harder than the elastic material of the elastic material layer 102D, in this example, PET resin. Further, in this example, the base 105E is made into a sheet-shaped member that is disposed on the position detecting device 300 and covers the whole of the position detection region of the position detecting sensor 310 of the position detecting device 300.

As illustrated in FIG. 24, the pen input device sheet 100E of this fifth modification example is composed of the base 105E and the elastic material layer 102D disposed on this base 105E. An optical material is used for this base 105E in the case of a terminal having the display device 202.

In this case, the tips of the protruding parts 1021DPb forming the recessed-protruding pattern 1021DP of the first layer portion 1021D on the side of the base 105E are made to abut against one surface of the base 105E.

Even with the above configuration, when writing input is made with the electronic pen on the pen input device sheet 100E of this fifth modification example, a feeling (writing feel or sense of writing) similar to that of the pen input device sheet 100 can be obtained by holding down the pen input device sheet 100E by a hand or tape to keep the pen input device sheet from moving similarly to paper.

Sixth Modification Example

Figure 25:
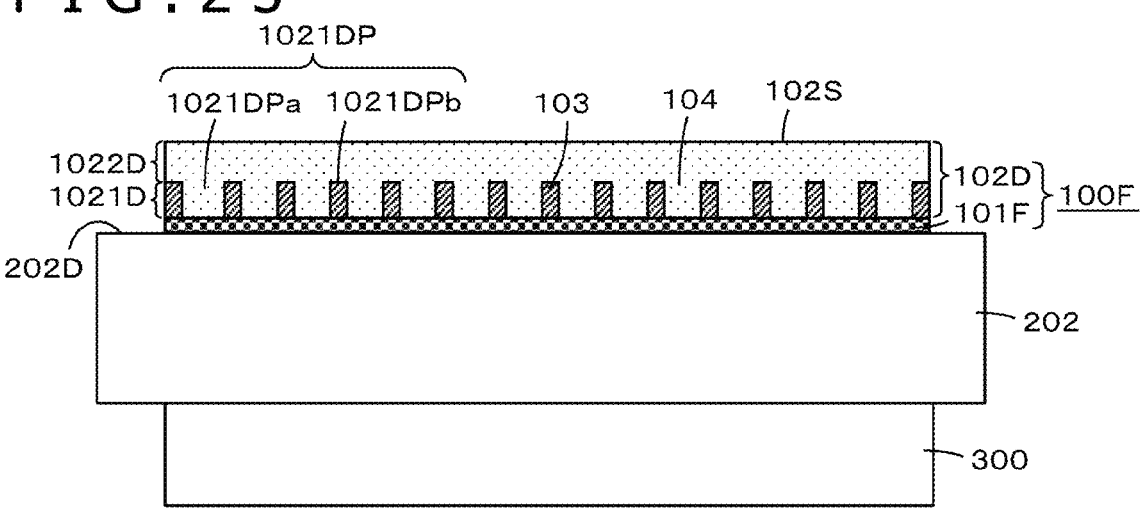
FIG. 25 is a sectional view for explaining a sixth modification example of the configuration example of the embodiment of the pen input device sheet according to this disclosure.

FIG. 25 is a diagram for explaining a specific configuration example (structure example) of a pen input device sheet 100F of a sixth modification example. In the pen input device sheet 100F of the example of FIG. 25, the same constituent part as that of the pen input device sheet 100D of the above-described fourth modification example is given the same reference numeral, and detailed description thereof is omitted.

The pen input device sheet 100F of this sixth modification example is a modification example in which an adhesive layer 101F is disposed on the surface on the side of the position detecting device 300 in the elastic material layer 102D forming the pen input device sheet 100D of the fourth modification example.

As illustrated in FIG. 25, the pen input device sheet 100F of this sixth modification example is composed of the adhesive layer 101F and the elastic material layer 102D disposed on this adhesive layer 101F. An optical material is used for this adhesive layer 101F in the case of a terminal having the display device 202.

In this case, the tips of the protruding parts 1021DPb forming the recessed-protruding pattern 1021DP of the first layer portion 1021D on the side of the adhesive layer 101F are made to abut against one surface of the adhesive layer 101F. Moreover, this pen input device sheet 100F is disposed to be stuck onto the display screen 202D of the display device 202 of the tablet-type information terminal 200.

In this example, almost the whole of the display region of the display screen 202D is employed as the position detection region of the position detecting sensor. Thus, the pen input device sheet 100F is disposed to cover the whole of the display region of the display screen 202D. Further, the exposed surface of this pen input device sheet 100F becomes an input surface of position indication by the electronic pen 1, that is, a writing input surface.

Even with the above configuration, when writing input is made with the electronic pen on the pen input device sheet 100F of this sixth modification example, a feeling (writing feel or sense of writing) similar to that of the pen input device sheet 100 can be obtained.

Seventh Modification Example

Figure 26:
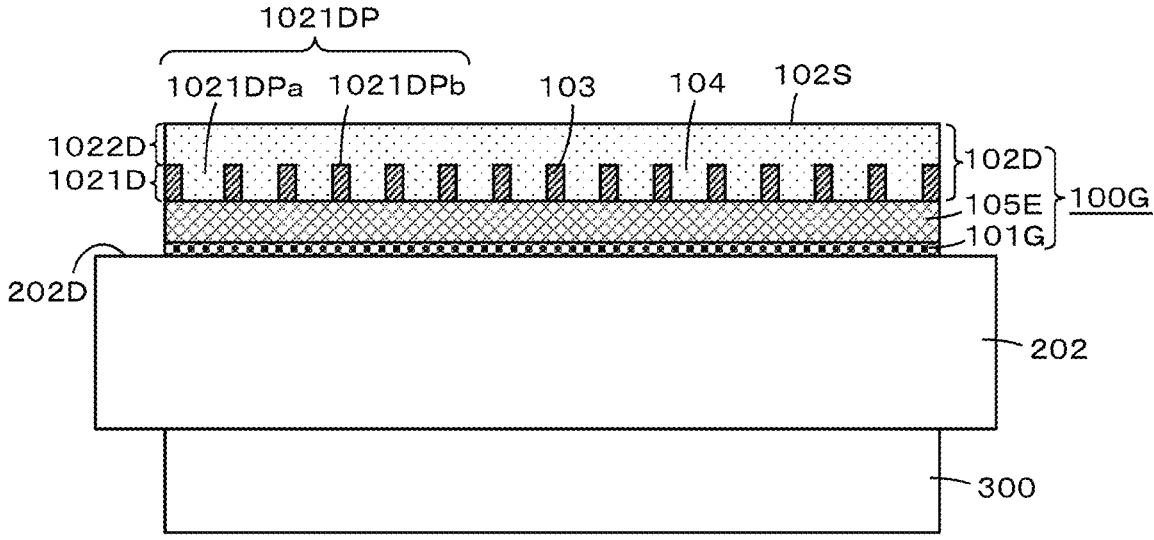
FIG. 26 is a sectional view for explaining a seventh modification example of the configuration example of the embodiment of the pen input device sheet according to this disclosure.

FIG. 26 is a diagram for explaining a specific configuration example (structure example) of a pen input device sheet 100G of a seventh modification example. In the pen input device sheet 100G of the example of FIG. 26, the same constituent part as that of the pen input device sheet 100E of the fifth modification example illustrated in the above-described FIG. 24 is given the same reference numeral, and detailed description thereof is omitted.

The pen input device sheet 100G of this seventh modification example is a modification example in which an adhesive layer 101G is added to the surface on the opposite side of the side of the elastic material layer 102D in the base 105E of the pen input device sheet 100E of the fifth modification example.

As illustrated in FIG. 26, the pen input device sheet 100G of this seventh modification example is composed of the adhesive layer 101G, the base 105E disposed on this adhesive layer 101G, and the elastic material layer 102D disposed on this base 105E. An optical material is used for this adhesive layer 101G and the base 105E in the case of a terminal having the display device 202. Moreover, this pen input device sheet 100G is disposed to be stuck onto the display screen 202D of the display device 202 of the tablet-type information terminal 200.

In this example, almost the whole of the display region of the display screen 202D is employed as the position detection region of the position detecting sensor. Thus, the pen input device sheet 100G is disposed to cover the whole of the display region of the display screen 202D.

Further, the exposed surface of this pen input device sheet 100G becomes an input surface of position indication by the electronic pen 1, that is, a writing input surface.

Even with the above configuration, when writing input is made with the electronic pen on the pen input device sheet 100G of this seventh modification example, a feeling (writing feel or sense of writing) similar to that of the pen input device sheet 100 can be obtained.

Eighth Modification Example

Figure 27:
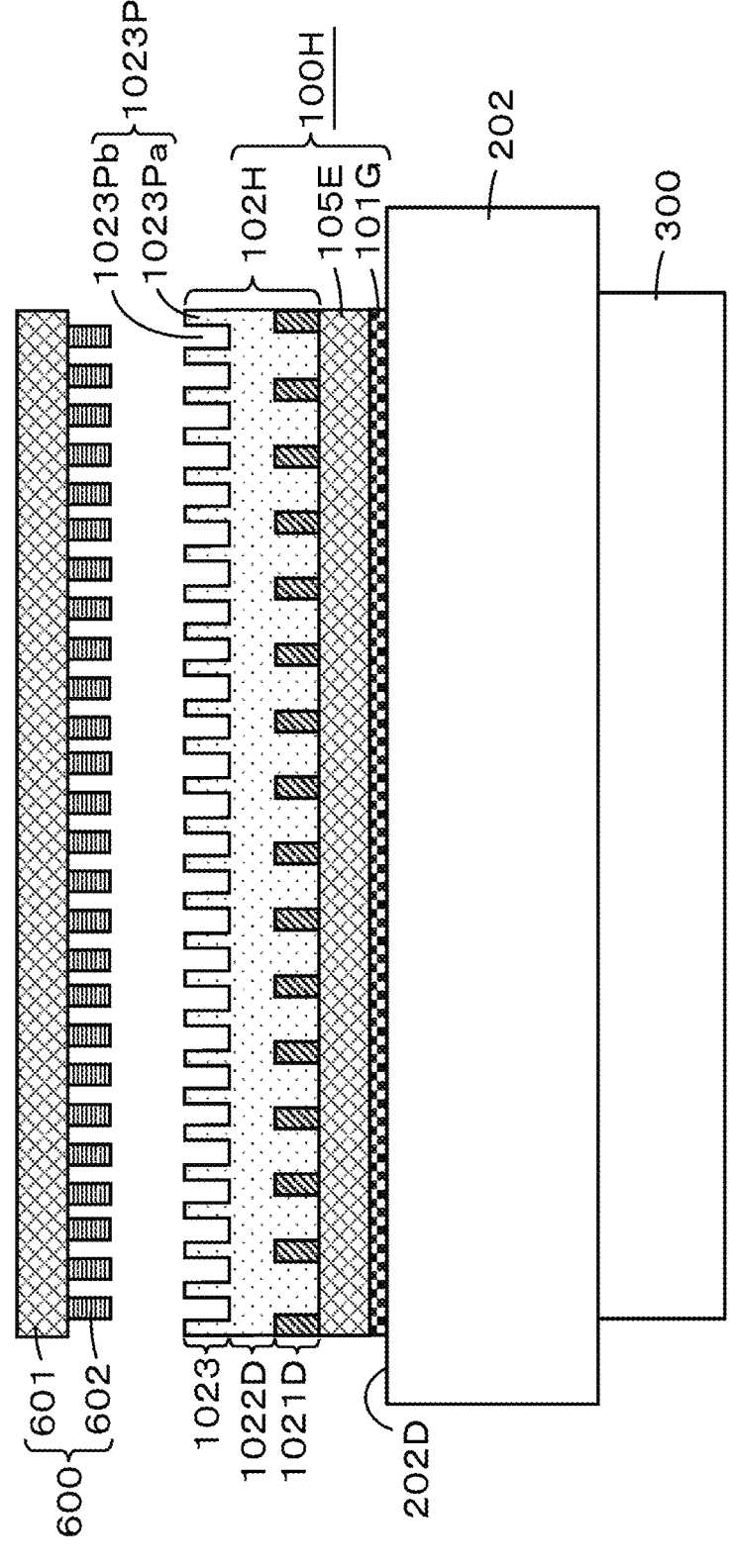
FIG. 27 is a sectional view for explaining an eighth modification example of the configuration example of the embodiment of the pen input device sheet according to this disclosure.

FIG. 27 is a diagram for explaining a specific configuration example (structure example) of a pen input device sheet 100H of an eighth modification example obtained by further modifying the pen input device sheet 100G of the seventh modification example. In the pen input device sheet 100H of the eighth modification example of FIG. 27, the same constituent part as that of the pen input device sheet 100G of the seventh modification example illustrated in the above-described FIG. 26 is given the same reference numeral, and detailed description thereof is omitted.

Also in the pen input device sheet 100H of this eighth modification example, a combination of a writing material and a writing medium of a target having the writing feel desired to be obtained with the electronic pen 1 is that in the case of writing with a pencil on paper as in the above-described first embodiment. Moreover, the pen input device sheet 100H of this eighth modification example is a modification example of the pen input device sheet 100 of the first embodiment and is also an improvement example thereof.

As illustrated in FIG. 27, the pen input device sheet 100H of this eighth modification example has a configuration in which the sheet-shaped adhesive layer 101G is disposed on the surface on the side of the display screen 202D of the display device 202 in the sheet-shaped base 105E and an elastic material layer 102H is disposed on the surface on the opposite side.

The elastic material layer 102H includes the first layer portion 1021D and the second layer portion 1022D formed in a manner similar to that of the elastic material layer 102D of the pen input device sheet 100G of the seventh modification example in FIG. 26 described above. In addition, a third layer portion 1023 is disposed on the second layer portion 1022D. This third layer portion 1023 is made to have a configuration having a recessed-protruding pattern 1023P in which protruding parts 1023Pa and recessed parts 1023Pb are present along the direction of a plane parallel to the sheet surface of the sheet-shaped base 105E.

As the recessed-protruding pattern 1023P of this third layer portion 1023, a pattern in which a recessed-protruding shape that is repeated at a specific regular interval or is irregularly disposed is formed is employed. Yet, the recessed-protruding pattern 1023P of this third layer portion 1023 is formed at a formation pitch PtH that is the average distance between protrusions shorter than the formation pitch Pt of the lattice of the lattice pattern of the recessed-protruding pattern 1021DP of the first layer portion 1021D. The line width of UV-curable ink may be either the same or varied.

In the pen input device sheet 100H of this eighth modification example, the formation pitch Pt of the lattice of the lattice pattern of the recessed-protruding pattern 1021DP of the first layer portion 1021D is selected to match the frequency that exhibits the maximum value of the peak waveform of the vibration of the kinetic friction coefficient in the vibration frequency characteristic of the kinetic friction coefficient as in the above-described first embodiment and second embodiment. Meanwhile, the recessed-protruding pattern 1023P of the third layer portion 1023 is selected to disperse the sharp peak waveform of the vibration frequency characteristic of the kinetic friction coefficient generated by the above-described method and form a peak waveform made broad in the vibration frequency distribution.

Thus, in the pen input device sheet 100H of this eighth modification example, the first layer portion 1021D is made to have a configuration different from the second layer portion 1022D and the third layer portion 1023 in both the density and the hardness per unit volume.

In the above description, "match the frequency that exhibits the peak" may be causing the frequency that exhibits the peak to be in a predetermined frequency range or causing the frequency that exhibits the peak to become a frequency that corresponds with or approximates a predetermined frequency as in the above-described embodiments.

The forming method of the recessed-protruding pattern 1023P of the third layer portion 1023 is as follows. Specifically, in this example, a transfer film member 600 is used as illustrated in FIG. 27. This transfer film member 600 is a member in which a recessed-protruding pattern corresponding to the recessed-protruding pattern 1023P of the third layer portion 1023 is formed on a sheet-shaped base film 601 by UV-curable ink and a hard member 602 is formed through being UV-printed by UV curing. In addition, a mold release agent is applied on the side of the surface on which the hard member 602 is formed in this transfer film member 600.

Further, the side on which the hard member 602 is formed in the base film 601 of this transfer film member 600 is pressed against the surface on the opposite side of the side of the base 105E in the elastic material layer 102D and is separated after the elastic material is cured. As a result, the third layer portion 1023 is formed in the elastic material layer 102D. Moreover, the adhesive layer 101G is disposed on the surface on the opposite side of the elastic material layer 102D in the base 105E.

The pen input device sheet 100H of the eighth modification example created in the above manner is disposed on the display screen 202D and is used in such a manner that the surface on the opposite side of the side on which the elastic material layer 102D is formed in the adhesive layer 101G is set on the display screen side, for example, similarly to the pen input device sheet 100 of the above-described first embodiment, and the side of the third layer portion 1023 having the recessed-protruding pattern 1023P becomes a writing input surface to which writing input with the electronic pen 1 is made.

According to the pen input device sheet 100H of this eighth modification example, a pen input device sheet having the vibration frequency characteristic of the kinetic friction coefficient closer to the vibration frequency characteristic of the kinetic friction coefficient in the combination of a writing material and a writing medium employed as the target can be obtained.

For example, when the writing material is a pencil in which the hardness of the core is 4B, 2B, and HB and the writing medium is copy paper, as illustrated in FIGS. 4A to 4C, 5A to 5C, and 6A to 6C, in the vibration frequency characteristics of the kinetic friction coefficient, the maximum value of the peak waveform tends to become not a value that is prominent in a spike manner from frequency ranges around the maximum value but an apex part of a broad waveform over several tends of hertz in the frequency distribution of the magnitude of the vibration in a vibration frequency range with a width of approximately 20 Hz including the maximum value of the peak waveform.

Thus, in this modification example, in the case of desiring to obtain the writing feel when writing is executed on the copy paper with the pencil in which the hardness of the core is 4B, 2B, and HB, the pen input device sheet 100H of this eighth modification example is configured in the following manner. Specifically, the first layer portion 1021D is formed in such a manner that the frequency that exhibits the maximum value of the peak waveform of the vibration of the kinetic friction coefficient in the vibration frequency characteristic of the kinetic friction coefficient when writing is executed with the electronic pen 1 on the pen input device sheet 100H of the eighth modification example is in a frequency range of 17 Hz±5 Hz as in the first embodiment. In addition, the third layer portion 1023 is formed by a recessed-protruding pattern formed at an interval that is the average distance between protrusions shorter than the recessed-protruding pattern of the first layer portion 1021D.

That is, the pen input device sheet 100H of this eighth modification example is configured in the following manner. Specifically, the line width of the UV-curable ink and the formation pitch of the lattice-shaped pattern when the hard member 103 formed by UV printing is formed on the base 105E are selected in such a manner that the frequency that exhibits the maximum value of the peak waveform of the vibration of the kinetic friction coefficient in the vibration frequency characteristic of the kinetic friction coefficient is in the frequency range of 17 Hz±5 Hz as in the first embodiment. In addition, the formation pitch of the recessed-protruding pattern of the UV-curable ink when the hard member 602 formed on the base film 601 of the transfer film member 600 is formed is set shorter than the formation pitch of the hard member 103 to disperse a certain vibration frequency based on the lattice pattern of the hard member 103 into lower and higher frequencies. On that occasion, by selecting the line width of the UV-curable ink and the formation pitch of the lattice-shaped pattern in the formation of the hard member 602 in such a manner that the frequency that exhibits the second peak of the vibration of the kinetic friction coefficient in the vibration frequency characteristic of the kinetic friction coefficient is in a frequency range of 80 Hz±5 Hz, the vibration frequency characteristics of the kinetic friction coefficient when the hardness of the core is 4B, 2B, and HB can be reproduced.

Further, in the case of the pencil in which the hardness of the core is 2H, as illustrated in FIGS. 7A to 7C, the frequency that exhibits the second largest peak of the vibration of the kinetic friction coefficient is in a frequency range of 100±ΔHz (Δ is 10, for example).

Thus, in the case of desiring to obtain the writing feel that is available when writing is executed on paper with the pencil in which the hardness of the core is 2H, the pen input device sheet 100H of this eighth modification example is configured in the following manner. The hard member 103 formed on the base 105E by UV printing is formed in a manner similar to that in the first embodiment. In addition, the line width of the UV-curable ink and the formation pitch of the lattice-shaped pattern when the hard member 602 formed on the base film 601 of the transfer film member 600 is formed are selected in such a manner that the frequency that exhibits the second peak of the vibration of the kinetic friction coefficient in the vibration frequency characteristic of the kinetic friction coefficient is in the frequency range of 100 Hz±10 Hz.

According to the pen input device sheet 100H of the eighth modification example configured as described above, the configuration is made to match not only the maximum value of the peak waveform of the vibration of the kinetic friction coefficient in the vibration frequency characteristic of the kinetic friction coefficient in the case of the writing material and the writing medium of the target but also a broad waveform of the frequency distribution of the magnitude of the vibration including vibration frequencies around the maximum value of the peak waveform. Therefore, the writing feel can be brought closer to the writing feel in the combination of the writing material and the writing medium of the target.

Other Embodiments or Modification Examples

In the above-described embodiments and modification examples, the hard member 103 and the hard member 602 for forming the recessed-protruding patterns 1021P, 1021DP, and 1023P formed in the first layer portions 1021 and 1021D and the third layer portion 1023 of the elastic material layers 102 and 102D are formed by executing UV printing with UV-curable ink. However, the forming method of the hard member is not limited to the UV printing, and any method may be employed as long as it is a method that can form the hard member. Further, the recessed-protruding shape may be formed by a method of deforming the base 105 or 105E.

Moreover, the hard member 103 and the hard member 602 are formed as the lattice-shaped pattern in the above-described embodiments but are not limited to the lattice-shaped pattern. For example, UV-curable resin with a shape of short lines may be disposed on the base 105 or 105E. Alternatively, UV-curable resin with a shape of dots may be disposed in the first layer portion 1021 or 1021D or on the base film 601.

Further, in the above-described embodiments, the examples in which the pen input device sheet is disposed on an assumption of a pen tablet-type terminal with which the pen input device sheet is not disposed on a display screen are employed. Thus, the adhesive layers 101, 101F, and 101G and the elastic material layers 102 and 102D are formed by a non-optical material. However, they are formed by a material having optical characteristics when the pen input device sheet is disposed on a display screen.

Moreover, in the above-described embodiments, the electronic pen and the position detecting device are configured by ones of the electromagnetic induction system. However, the electronic pen and the position detecting device with which the pen input device sheet according to this disclosure is used are not limited to ones of the electromagnetic induction system and may be ones of any system such as a capacitive coupling system or another system.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pen input device sheet for a position detection region of a position detecting sensor, the pen input device sheet comprising:

an elastic material layer that has elasticity and is composed of a plurality of layer portions stacked in a thickness direction of the pen input device sheet, wherein, in operation, a side opposite of a side of the position detecting sensor in the elastic material layer is a writing input surface to which writing input with an electronic pen is made, wherein the pen input device sheet is configured such that a vibration frequency characteristic of a kinetic friction coefficient when the electronic pen is moved at a predetermined speed on the writing input surface of the pen input device sheet matches the vibration frequency characteristic of the kinetic friction coefficient when a predetermined writing material is moved at the predetermined speed on a predetermined writing medium, wherein the pen input device sheet is configured such that a frequency that exhibits a peak magnitude of vibration of the kinetic friction coefficient defined by regarding, as a maximum value, an apex of a waveform of frequency distribution of magnitudes of the vibration in the vibration frequency characteristic of the kinetic friction coefficient when the electronic pen is moved at the predetermined speed on the writing input surface of the pen input device sheet in a state in which a predetermined writing pressure is applied is in a predetermined frequency range, wherein a hardness of a tip part of the predetermined writing material that comes into contact with the predetermined writing medium is one of a plurality of predetermined hardnesses, and wherein the frequency that exhibits the peak magnitude of the vibration of the kinetic friction coefficient is set according to the hardness of the tip part of the predetermined writing material.

2. The pen input device sheet according to claim 1, wherein the pen input device sheet is configured such that a frequency that exhibits a peak magnitude of vibration of the kinetic friction coefficient prominent from a waveform of frequency distribution of magnitudes of the vibration in the vibration frequency characteristic of the kinetic friction coefficient when the electronic pen is moved at the predetermined speed on the writing input surface of the pen input device sheet in a state in which a predetermined writing pressure is applied is in a predetermined frequency range.

3. The pen input device sheet according to claim 1, wherein the pen input device sheet is configured such that a frequency that exhibits a peak magnitude of vibration of the kinetic friction coefficient in the vibration frequency characteristic of the kinetic friction coefficient when the electronic pen is moved at the predetermined speed on the writing input surface of the pen input device sheet in a state in which a predetermined writing pressure is applied corresponds to a frequency that exhibits a peak magnitude of vibration of the kinetic friction coefficient in the vibration frequency characteristic of the kinetic friction coefficient when the predetermined writing material is moved at the predetermined speed on the predetermined writing medium in a state in which the predetermined writing pressure is applied.

4. The pen input device sheet according to claim 1, wherein the predetermined writing material is a pencil, and the predetermined writing medium is paper.

5. The pen input device sheet according to claim 1, wherein the predetermined writing material is a ballpoint pen, and the predetermined writing medium is paper.

6. The pen input device sheet according to claim 1, wherein a material having elasticity in the elastic material layer is polyvinyl chloride resin.

7. The pen input device sheet according to claim 1, wherein the layer portions of the elastic material layer have configurations different from each other.

8. The pen input device sheet according to claim 7, wherein the layer portions of the elastic material layer are different from each other in density per unit volume.

9. The pen input device sheet according to claim 7, wherein the layer portions of the elastic material layer are different from each other in hardness per unit volume.

10. The pen input device sheet according to claim 1, wherein a base layer is disposed on a surface on a side of the elastic material layer between the position detecting sensor and the elastic material layer.

11. The pen input device sheet according to claim 10, wherein an adhesive layer is disposed on a surface on a side of the base layer between the position detecting sensor and the base layer.

12. The pen input device sheet according to claim 1, wherein an adhesive layer is disposed on a surface on a side of the elastic material layer between the position detecting sensor and the elastic material layer.

* * * * *